(12) United States Patent
Itoh et al.

(10) Patent No.: US 8,355,838 B2
(45) Date of Patent: Jan. 15, 2013

(54) VEHICULAR INPUT DEVICE AND METHOD FOR CONTROLLING THE SAME

(75) Inventors: Masahiro Itoh, Ichinomiya (JP); Takeshi Haruyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 278 days.

(21) Appl. No.: 12/928,625

(22) Filed: Dec. 15, 2010

(65) Prior Publication Data
US 2011/0160957 A1 Jun. 30, 2011

(30) Foreign Application Priority Data
Dec. 25, 2009 (JP) ................................. 2009-294514

(51) Int. Cl.
*G06F 3/02* (2006.01)
*G09G 5/08* (2006.01)
(52) U.S. Cl. ........... 701/36; 345/157; 345/159; 715/856
(58) Field of Classification Search .................. None
See application file for complete search history.

(56) References Cited

U.S. PATENT DOCUMENTS

| | | | | |
|---|---|---|---|---|
| 5,508,717 | A * | 4/1996 | Miller | 715/858 |
| 7,293,246 | B2 | 11/2007 | Baudisch et al. | |
| 7,362,306 | B2 * | 4/2008 | Shibazaki et al. | 345/157 |
| 7,535,457 | B2 * | 5/2009 | Matsumoto et al. | 345/161 |
| 2004/0189714 | A1 | 9/2004 | Fox et al. | |
| 2005/0195167 | A1 * | 9/2005 | Matsumoto et al. | 345/161 |

FOREIGN PATENT DOCUMENTS

| | | |
|---|---|---|
| JP | 03-068014 | 3/1991 |
| JP | 05-046311 | 2/1993 |
| JP | 5-73206 | 3/1993 |
| JP | 5-249941 | 9/1993 |
| JP | 6-289834 | * 10/1994 |
| JP | 8-123620 | 5/1996 |
| JP | 8-152971 | 6/1996 |
| JP | 09-265353 | 10/1997 |
| JP | 10-83254 | 3/1998 |
| JP | 10-133822 | 5/1998 |
| JP | 11-85402 | 3/1999 |
| JP | 2008-191928 | 8/2008 |
| JP | 2008-282367 | 11/2008 |

OTHER PUBLICATIONS

Office action dated Nov. 8, 2011 in corresponding Japanese Application No. 2009-294514.

* cited by examiner

*Primary Examiner* — Michael J. Zanelli
(74) *Attorney, Agent, or Firm* — Harness, Dickey & Pierce, PLC

(57) ABSTRACT

An indication unit indicates arranged selective areas on a display surface for accepting input. A move unit moves an instructed position on the display surface according to an operation quantity of an operation unit. A selected-state determination unit determines a selected-state area from the selective areas according to the instructed position. A width determination unit determines a width of the selected-state area in each of an x-axis direction and a y-axis direction of the display surface. A moving speed set unit sets a moving speed of the instructed position variably at least when the instructed position passes through the selected-state area such that: a velocity component in the x-axis direction becomes larger as the determined width in the x-axis direction becomes larger, and a velocity component in the y-axis direction becomes larger as the determined width in the y-axis direction becomes larger.

15 Claims, 25 Drawing Sheets

| BUTTON No. | CENTER | | SIZE | |
|---|---|---|---|---|
| | Bx | By | Sx | Sy |
| 1 | | | | |
| 2 | | | | |
| ... | | | | |
| 255 | | | | |
| OUTSIDE | — | — | Sxw | Syh |

VEHICULAR INPUT DEVICE AND METHOD FOR CONTROLLING THE SAME

CROSS REFERENCE TO RELATED APPLICATIONS

This application is based on and incorporates herein by reference Japanese Patent Application No. 2009-294514 filed on Dec. 25, 2009.

FIELD OF THE INVENTION

The present invention relates to a vehicular input device. The present invention further relates to a method for controlling the vehicular input device.

BACKGROUND OF THE INVENTION

A conventional vehicle is equipped with an input device including an in-vehicle display unit having a display surface. The display surface indicates multiple button icons (selective area) being arranged for accepting input. In addition, the display surface indicates a pointer in order to select one of the button icons. According to such a configuration, a user is enabled to manipulate an operation knob to move the pointer. When the pointer is on a button icon, the button icon is in a selected state. A user makes a determination input on the button icon in the selected state thereby to execute a control processing corresponding to the button icon. The operation knob may be a joystick type device, a cross-shaped key device having buttons in the cross direction, or the like. In these devices, the moving speed of the pointer is determined according to a tilt angle of the joystick, a push duration time of the cross-shaped key device, or the like.

It is noted that, when a user intends to select a small button icon in such a device, the pointer may pass over the small button icon quickly. Consequently, a user cannot select a small button icon easily. Contrary, when a user intends to pass the pointer through a large button icon, a long waiting time is required. Consequently, a user may feel uncomfortable. Furthermore, when the pointer passes through a section other than the button icon, a meaningless waiting time is also required. Furthermore, when a user uses a joystick type device, the user may manipulate a tilt angle of the joystick to change an operation quantity of the joystick. Thus, the user can change the moving speed of the pointer. When the user intends to pass through a large button icon and a section between two adjacent button icons, the user may tilt the joystick by a large angle to pass the pointer through the large button icon or the section quickly. In this case, when a small button icon is located beyond the large button icon or the section, the user may pass the pointer over the small button icon quickly due to excessive moving speed of the pointer caused when passing through the large button icon or the section. Consequently, the user cannot select the small, button icon easily.

For example, JP-A-5-73206 discloses a configuration in which moving speed of a pointer is changed in a certain region. JP-A-5-11-85402 discloses a configuration in which a region is divided into small regions, and moving speed of the pointer is changed according to the number of the buttons in each of the small regions. JP-A-5-5-249941 discloses a configuration in which moving speed of a pointer is reduced inside a button icon. It is noted that all JP-A-5-73206, JP-A-11-85402, and JP-A-5-249941 are irrelevant to a configuration configured to restrict a pointer from passing over a small button icon and reduce a waiting time when a pointer passes through a large button icon.

SUMMARY OF THE INVENTION

In view of the foregoing and other problems, it is an object of the present invention to produce a vehicular input device configured to restrict a pointer from passing over a small button icon and reducing a waiting time when the pointer passes through a large button icon. It is another object of the present invention to produce a method for controlling the vehicular input device.

According to one aspect of the present invention, a vehicular input device comprises an indication unit configured to cause a display surface to indicate a plurality of arranged selective areas for accepting input, the display surface being assigned with an x-axis direction and a y-axis direction being perpendicular to each other. The vehicular input device further comprises an operation unit configured to be manipulated for moving an instructed position on the display surface. The vehicular input device further comprises an instructed position move unit configured to move the instructed position on the display surface according to an operation quantity of the operation unit. The vehicular input device further comprises a selected-state area determination unit configured to determine a selected-state area being selected from the selective areas according to the instructed position. The vehicular input device further comprises a width determination unit configured to determine a width of the selected-state area in the x-axis direction and a width of the selected-state area in the y-axis direction. The vehicular input device further comprises a moving speed set unit configured such that when the instructed position move unit moves the instructed position on the display surface and at least when the instructed position passes through the selected-state area, the moving speed set unit sets a moving speed of the instructed position variably, such that: i) a velocity component of the moving speed of the instructed position in the x-axis direction becomes larger as the width of the selected-state area in the x-axis direction determined by the width determination unit becomes larger; and ii) a velocity component of the moving speed of the instructed position in the y-axis direction becomes larger as the width of the selected-state area in the y-axis direction determined by the width determination unit becomes larger.

According to another aspect of the present invention, a method for controlling a vehicular input device configured to cause a display surface to indicate a plurality of arranged selective areas for accepting input, the display surface being assigned with an x-axis direction and a y-axis direction being perpendicular to each other, the method comprises determining a selected-state area being selected from the selective areas according to an instructed position which is moved on the display surface according to an operation quantity of an operation unit. The method further comprises determining a width of the selected-state area in the x-axis direction and a width of the selected-state area in the y-axis direction. The method further comprises setting a moving speed of the instructed position variably at least when the instructed position passes through the selected-state area such that: i) a velocity component of the moving speed of the instructed position in the x-axis direction becomes larger as the determined width of the selected-state area in the x-axis direction becomes larger, and ii) a velocity component of the moving speed of the instructed position in the y-axis direction becomes larger as the determined width of the selected-state area in the y-axis direction becomes larger.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

As follows, an embodiment of an operation apparatus will be described with reference to drawings.

Figure 1:
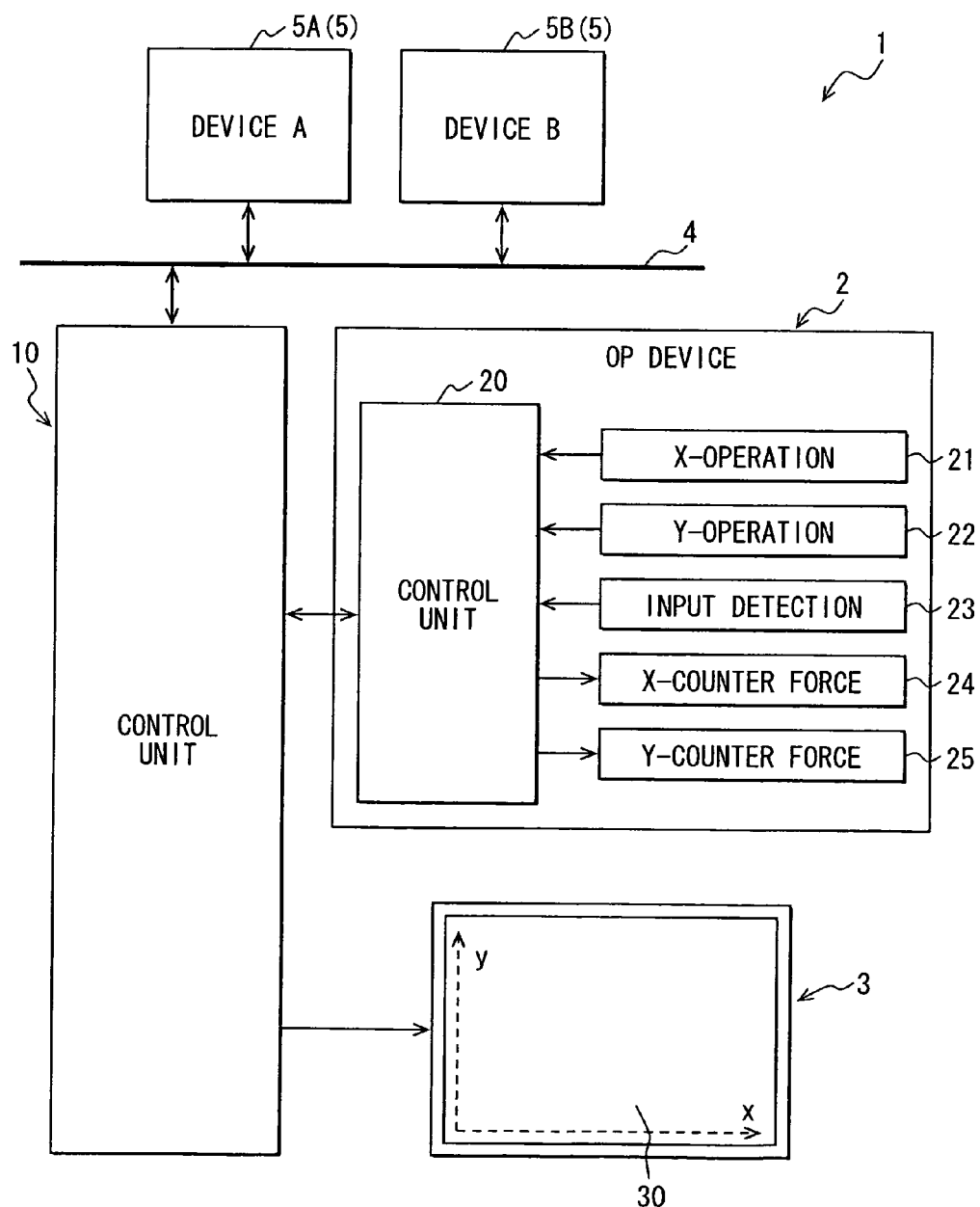
FIG. 1 is a block diagram showing a configuration of a vehicular input device according to an embodiment of the present invention.

FIG. 1 is a block diagram showing the operation apparatus for a vehicle, according to the embodiment. A vehicular input device 1 shown in FIG. 1 includes a display unit (indication unit) 3, an operation device 2, and a system control unit 10. The operation device 2 enables operation to move an instructed position on a screen of the display unit 3. The display unit (indication unit) 3 and the operation device 2 are connected with the system control unit 10.

The control unit 10 mainly includes a generally known microcomputer including a CPU, a ROM, a RAM, and the like (none shown). The CPU executes programs stored in a predetermined storage unit, such as the ROM and an external storage device (none shown), to perform various kinds of controls. The control unit 10 is further configured to exchange data with a control unit of other in-vehicle devices 5 (5A, 5B, and the like) through an in-vehicle LAN 4. Specifically, the control unit 10 is further configured to transmit a control signal for driving and controlling another controlled object of a control unit thereby to drive and control the controlled object. In this way, the control unit 10 utilizes a device function of each of the in-vehicle devices 5. For example, the control unit 10 is configured to receive operation information from the operation device 2. Thereby, the control unit 10 causes the in-vehicle devices 5, such as a navigation device, a vehicle air conditioner, and a car audio, connected through the in-vehicle LAN 4 to perform corresponding control operations according to the operation information received from the operation device 2. The control unit 10 is configured to cause a display surface 30 of the display unit 3 to indicate a corresponding screen according to the operation information received from the operation device 2.

The display unit 3 may employ, for example, a generally-known liquid crystal display or the like. The display surface 30 of the display unit 3 indicates a screen according to a display control signal outputted from the control unit 10. The display surface 30 of the display unit 3 has an indication coordinate system assigned with an x-axis direction and a y-axis direction, which intersect perpendicularly to each other. Multiple button images (selective areas) 6 are located on the indication coordinate system for input operation. The button images 6 are indicated on the display surface 30. The control unit 10 functions as a display control unit for controlling indication of the display unit 3.

Figure 2:
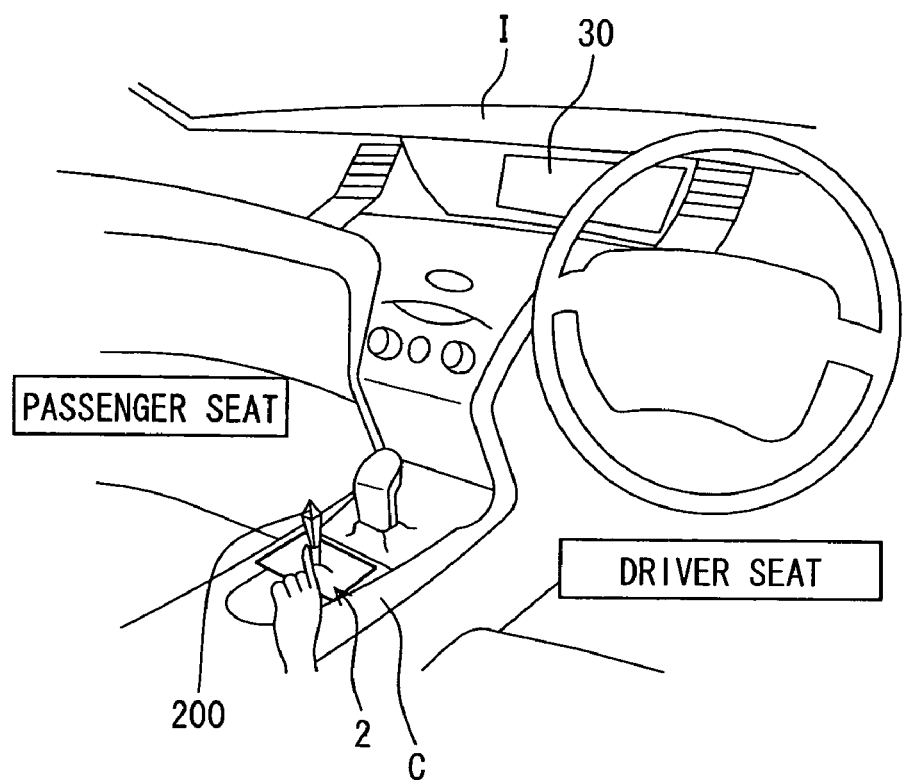
FIG. 2 is a perspective view showing a vehicle interior equipped with the vehicular input device of FIG. 1.

The operation device 2 is a pointing device (instructed-position moving operation unit) to move an instructed position P on the display surface 30 according to an operation quantity of an operation knob 200. As shown in FIG. 2, the operation device 2 is located in a different position from the display unit 3 to function as a remote operation unit. Specifically, the operation device 2 includes the operation knob 200, operation quantity detection units (X-Y operation quantity detection unit) 21, 22 and a control unit (instructed position movement control unit) 20. The operation knob 200 is for moving instructed position P on the display surface 30. The operation quantity detection units 21, 22 are for detecting operation of the operation knob 200 in the X direction and the Y direction. The control unit 20 is connected with the operation quantity detection units 21, 22 and configured to move the instructed position P on the display surface 30 according to a detected operation quantity in the X direction and the Y direction. The operation device 2 further functions as a determination input operation unit for enabling the operation knob 200 to cause a determination input to a button image (selected-state area) 6, which is being selected. A determination input detection unit 23 is connected to the control unit 20 for detecting the determination input. An operation unit for the determination input may be provided separately from the operation knob 200.

The control unit 20 of the operation device 2 mainly includes a generally known microcomputer including a CPU, a ROM, a RAM, and the like (none shown). The CPU executes programs stored in a predetermined storage unit, such as the ROM and an external storage device (none shown), to perform various kinds of controls. Specifically, the control unit 20 obtains operation information on a moving operation made on the operation knob 200 in order to move the instructed position P on the display surface 30. The control unit 20 further determines an operation direction and an operation quantity according to the operation information. The control unit 20 further calculates a moving speed V according to the operation direction, the operation quantity, and the coordinates of the instructed position P being determined. The control unit 20 further calculates target coordinates where the instructed position P moves. The control unit 20 further performs a control to move indication of the instructed position P on the display surface 30 according to the target coordinates and the moving speed being calculated. In addition, the control unit 20 makes a determination whether the instructed position P is inside or outside of the button image 6 and performs a feedback control of the counter force based on the determination result. The control unit 20 is connected with counter force generation units (counter force application unit, oscillation application unit) 24, 25. The counter force generation units 24, 25 cause a counter force, such as a viscous counter force and an oscillation counter force, in the X direction and the Y direction relative to the operation knob 200.

Figure 3:
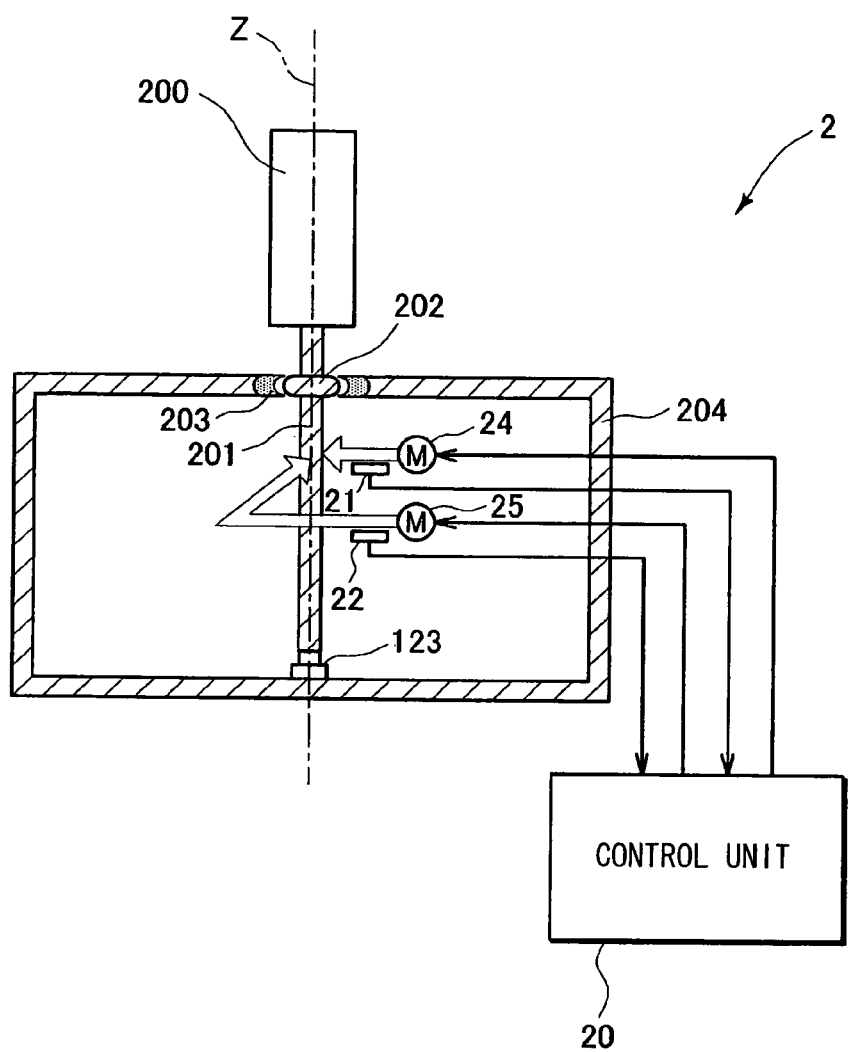
FIG. 3 is a cross sectional view showing an operation unit of the vehicular input device of FIG. 1.

FIG. 3 is a sectional view showing the operation device 2. In the present example, the operation device 2 is a pointing device configured as a joystick type operation unit manipulated by a user. An operation knob 200 is mounted on a tip end of a stick-like operation shaft portion 201. The opposite end of the operation shaft portion 201 is inserted in an accommodating portion 204. The operation shaft portion 201 has an intermediate portion having a spherical part 202. A bearing 123 is provided in the accommodating portion 204 for supporting the spherical part 202 thereby to support the operation shaft portion 201 such that the operation shaft portion 201 is configured to swing freely relative to the accommodating portion 204. In the present structure, the operation knob 200 has a two-dimensional operation flexibility and operable freely in a predetermined range on a two-dimensional movable surface.

The joystick type operation device 2 has an operation shaft line Z maintained in a neutral angle position when being not operated. Alternatively, the operation shaft line Z of the joystick type operation device 2 is inclined from the neutral angle position toward a position instructed on the display surface 30 of the display unit 3 when being operated. When the joystick type operation device 2 is operated, the joystick type operation device 2 is applied with a counter force (return force) to the neutral angle position in opposition to the operation. The counter force generation units 24, 25 are for generating the counter force and located in the accommodating portion 204. The counter force generation units 24, 25 are actuators configured to apply a force to the joystick type operation unit 21 in a direction where operation is permitted. The counter force generation units 24, 25, for example, are motors respectively provided for the X-axis and the Y-axis, which intersect perpendicularly to each other. The counter force generation units 24, 25 are connected with an operation shaft portion 201 via (not shown) gears. Rotary motions caused by the counter force generation units 24, 25 are converted into linear motions being respectively in parallel with the axial directions (X-axis, Y-axis) and transmitted to the operation shaft portion 201. Thereby, the force caused by the counter force generation units 24, 25 is transmitted to the operation knob 200. The motors 24, 25 operate to apply counter force against an operation of the operation knob 200 according to a driving signal from the control unit 20. Specifically, as the operation knob 200 is operated to be moved from the neutral position, the control unit 20, in general, controls the actuators (motors) 11, 12 to apply the counter force to the joystick type operation unit 21 in opposition to the direction in which the operation is currently performed. Naturally, the control unit 20 does not apply the counter force when the joystick type operation unit 21 is in the neutral position. The rotation axes of the motors 11, 12 are equipped with rotary encoders. The rotary encoders function as operation quantity detection units (X-Y operation detection units) 21, 22 for detecting an operation quantity (operation movement) in the X direction and the Y direction.

The operation device 2 is not limited to a joystick type device and may be a cross-shaped key device equipped with push switches in the cross-shaped four directions. The counter force generation units 24, 25 may be omitted.

The control unit 20 of the operation device 2 is connected to the control unit 10 and configured to compute operation information according to operations detected by the detection units 21 to 23. Thus, the control unit 20 outputs the computed operation information to the control unit 10. The control unit 10 outputs image data to the display unit 3 for causing the display unit 3 to indicate a button operation screen. The button operation screen includes arranged multiple button images (selective area) 6 for an input operation. The image data includes background image data for generating a background image on the screen and button image data (selective area image data) for generating a button image on the screen. The image data further includes image data reflecting operation information successively inputted from the operation device 2.

Figure 4:
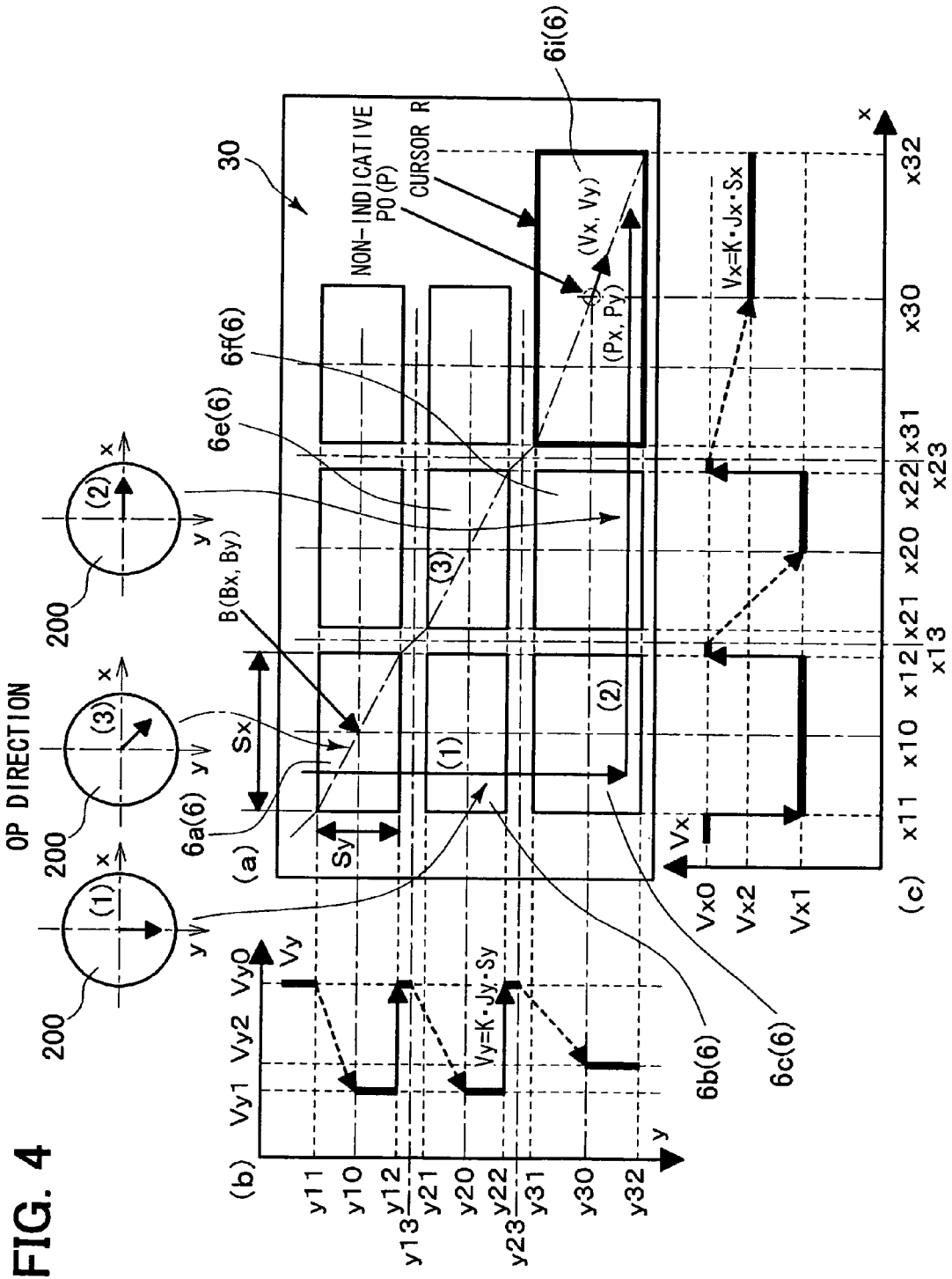
FIG. 4 is a view showing a first example of a relationship between a moving track of an instructed position and a moving speed when the operation unit of FIG. 1 is manipulated.

Specifically, the display surface 30 of the display unit 3 may indicate, for example, a button operation screen shown by (a) in FIG. 4. The control unit 10 determines the coordinates (Px, Py) of the instructed position P on the button operation screen according to the operation information from the control unit 20. The control unit 10 further moves the coordinates (Px, Py) according to a two-dimensional moving operation (tilt operation) of the operation knob 200 in the X-Y directions. For example, as shown by the numeral (1), the coordinates (Px, Py) may be moved in the y-axis direction on the display surface 30. Alternatively, as shown by the numeral (2), the coordinates (Px, Py) may be moved in the x-axis direction on the display surface 30. Alternatively, as shown by the numeral (3), the coordinates (Px, Py) may be moved arbitrarily on the display surface 30 being a two-dimensional, plane specified by the x-axis and the y-axis. The control unit 10 (selected-state area determination unit) determines a selected-state area 6i, which is being selected, among the multiple button images 6 according to the instructed position P. The control unit 10 (selected-state area highlight unit) further highlights the button image 6i, which is being selected, with a highlighted image (cursor) R to be emphasized compared with other button images 6 and causes the display unit 3 to indicate the highlighted button image 6i. The highlighted image R is a highlighted cursor (button frame image) being a button frame of the button image 6 being selected. The highlighted image R is an image data reflecting the operation information The highlighted image R includes the image data required for imaging the cursor. The display position of the highlighted image R is determined according to the operation information, and the highlighted image R is indicated.

The operation information successively inputted from the operation device 2 is reflected on the moving speed control of the instructed position P. Specifically, the control unit (width determination unit) 10 determines the width Sx of the button image 6, which is being selected, in the x-axis direction and the width Sy of the button image 6 in the y-axis direction. The control unit (moving speed set unit) 10 variably sets a moving speed V of the instructed position P at least when the instructed position P is passing on the button image 6 being selected. Specifically, the control unit 10 variably sets the moving speed V such that a velocity component Vx in the x-axis direction becomes higher as the width Sx of the button image 6, which is being selected, in the x-axis direction becomes larger. In addition, the control unit 10 variably sets the moving speed V such that a velocity component Vy in the y-axis direction becomes higher as the width Sy of the button image 6, which is being selected, in the y-axis direction becomes larger. For example, in the case of FIG. 4, the control unit 10 determines the width Sx and the width Sy of the button image 6, which is being selected, in the x-axis direction and the y-axis direction. Further, the control unit 10 variably sets the velocity component Vx of the moving speed V of the instructed position P in the x-axis direction to be in proportion to the determined width Sx in the x-axis direction. Further, the control unit 10 variably sets the velocity component Vy of the moving speed V of the instructed position P in the y-axis direction to be in proportion to the determined width Sy in the y-axis direction.

Figure 7:
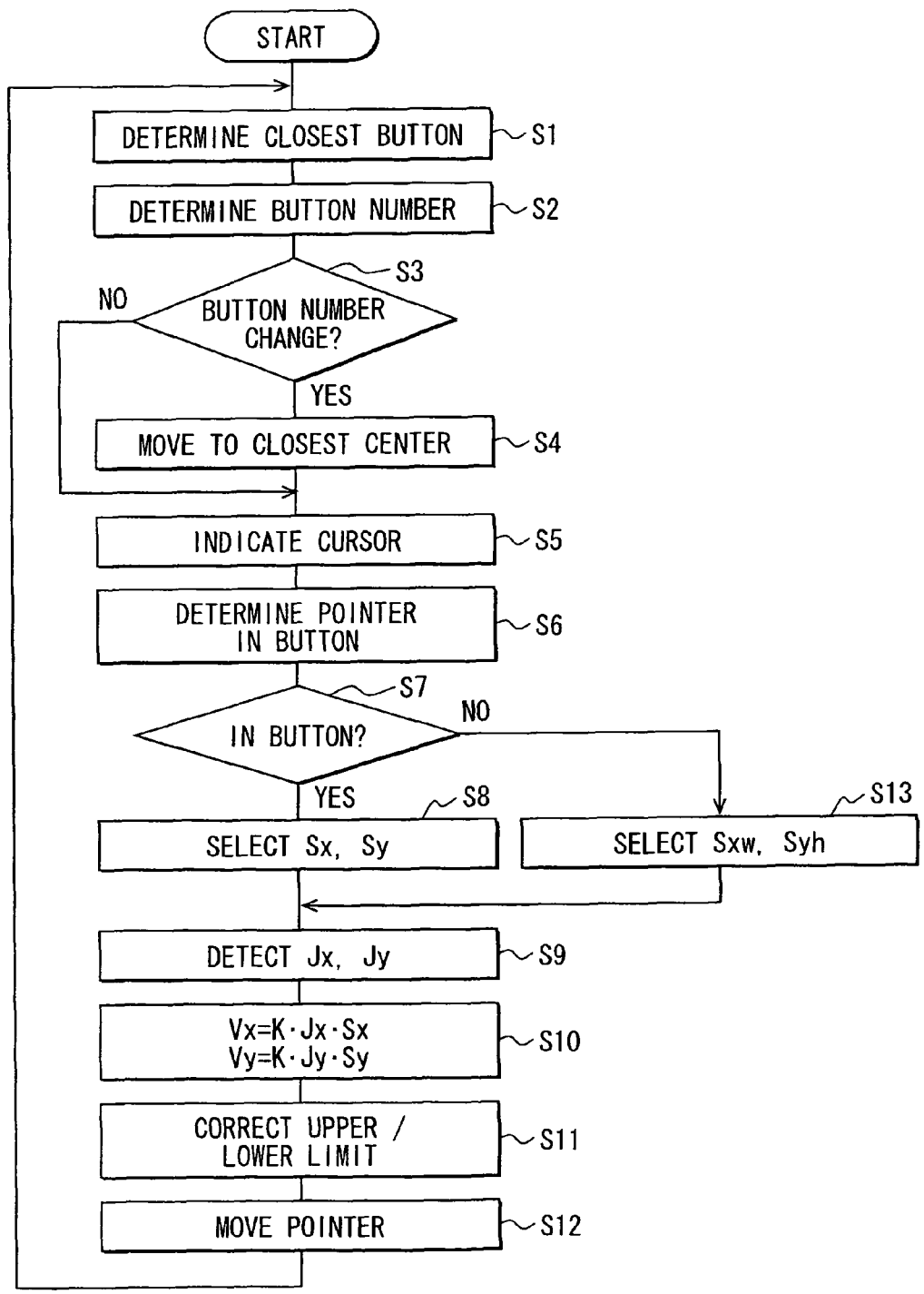
FIG. 7 is a flowchart which showing a moving speed control of the instructed position in FIGS. 4, 5.

The control unit 10 performs the control of the moving speed V of the instructed position P in a manner specified by a flowchart shown in FIG. 7, for example.

At S1, the control unit (closest selective area determination unit) 10 first determines a button image 6 (closest button image, closest selective area), which is presently closest to the instructed position P, among the multiple button images 6 on the display surface 30. In the present example, the control unit 10 evaluates a button image 6, to which the present instructed position P is in a closest position. At S2, the control unit 10 determines the button image 6 closest to the present instructed position P according to the evaluation result. On determination, the control unit 10 (closest area storage unit) stores the button image 6 as a cursor-indicated button to be identifiable. According to the present embodiment, the control unit 10 first calculates the distance between the instructed position P and each of button images 6 on the display surface 30. Subsequently, the control unit 10 selects one of the button images 6, which is the minimum in the calculated distance, and determines the selected button image 6, which is the closest to the instructed position P. Thus, the control unit 10 stores a button number (button identification information) of the button image 6 in a memory device of the control unit 10.

Figures 9, 10:
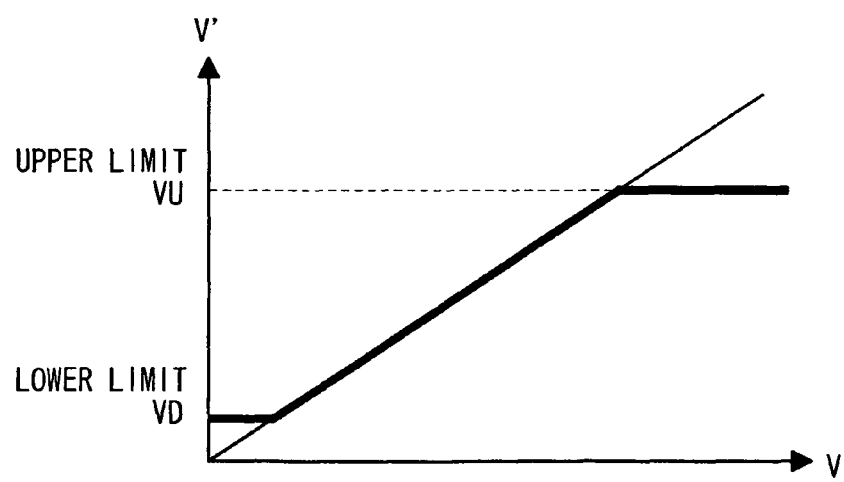
FIG. 9 is a view showing button data.
FIG. 10 is a view showing determination of an upper limit and a lower limit of the moving speed of the instructed position.

Specifically, as shown in FIG. 9, the internal memory of the control unit 10 or an external storage device (not shown) connected to the control unit 10 stores a button center coordinate data (button position information) and a button size data (button width information) associated with the button number (button identification information) of each button image 6. The button center coordinate data and the button size data are equivalent to button data (selective area information) other than image data of the button image.

Figure 8:
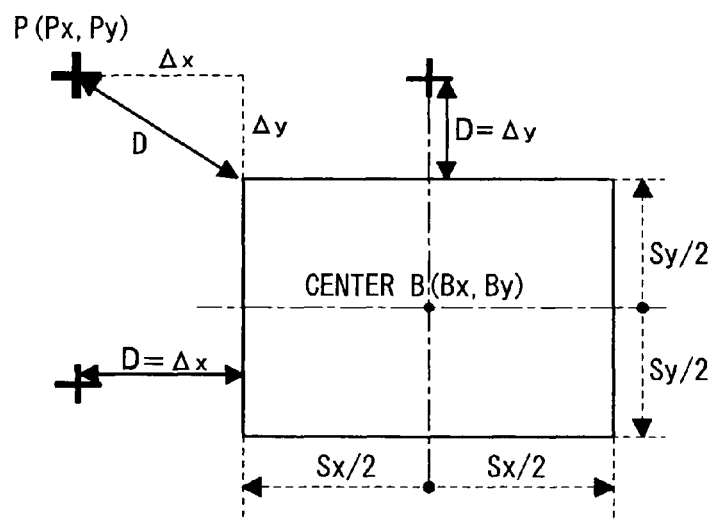
FIG. 8 is a view showing a processing for determining a button closest to the instructed position and a processing for determining whether the instructed position is in the button.

The control unit 10 first reads the stored button center coordinate data and the button size data. Subsequently, as shown in FIG. 8, the control unit 10 calculates an absolute value of a difference between the x-coordinate Px of the instructed position P and the button center coordinate Bx of each button image. 6. The control unit 10 further calculates a value Δx by subtracting a value Sx/2, which is a half value of the button width of the button image 6 in the x direction, from the calculated absolute value. Similarly, the control unit 10 calculates an absolute value of a difference between the y-coordinate Py of the instructed position P and the button center coordinate By of each button image 6. The control unit 10 further calculates a value Δy by subtracting a value Sy/2, which is a half value of the button width of the button image 6 in the y direction, from the calculated absolute value.

The Δx and Δy are the minimum distances between the present instructed position P and the button image 6 in the x direction and the y direction. Therefore, when both the Δx and the Δy are less than or equal to 0, it is obvious that the present instructed position P is inside the button image 6. Thus, the minimum distance D from the present instructed position P to the button image 6 is 0.

When one of the Δx and the Δy is less than or equal to 0, the one of the Δx and the Δy, which is less than or equal to 0, is deemed to be 0. In addition, the other one of the Δx and the Δy, which is greater than 0, is the minimum distance D from the present instructed position P to the button image 6. When both the Δx and the Δy are greater than 0, the control unit 10 calculates the minimum distance D from the present instructed position P to the button image 6 according to both the Δx and the Δy. In this way, the control unit 10 calculates the minimum distance D between the present instructed position P and each of the button images 6 indicated on the display surface 30 for each of the button images 6. In addition, the control unit 10 determines a button image 6, which is the minimum in the distance D, as the button image 6 closest to the instructed position P (S1). Thus, the control unit 10 stores the button number of the closest button image 6 in the memory of the control unit 10 (S2). When both the Δx and the Δy of a button image 6 are less than or equal to 0, the button image 6 is selected as the button image 6 closest to the instructed position P.

Summarizing, the example of FIG. 8 includes the following contents of a determination logic whether a button is a closest to the instructed position and whether the instructed position (pointer) is inside a button or outside a button.

1. Δx and Δy are calculated.
2. When Δx is a negative value, Δx is set at 0.
When Δy is a negative value, Δy is set at 0.
3. When both Δx and Δy are 0, the instructed position (pointer) is determined to be inside a closest button, and the button number of the closest button is stored.
4. When the instructed position (pointer) is outside all the buttons, the button number of the closest button with the smallest distance D is stored.

At subsequent S3, the control unit (sameness determination unit) 10 compares the latest button number (button identification information) stored at S2 with a previous button number (button identification information) stored immediately before thereby to determine whether the latest button number is different from the previous button number. When the button numbers are the same as each other (S3: No), the processing proceeds to S5. At S5, the control unit 10 causes indication of the highlighted image R on the button image 6 closest to the present instructed position P thereby to exhibit that the closest button image 6 is in a selected state. Alternatively, when the button numbers are different from each other (S3: Yes), the processing proceeds to S4. At S4, referring to FIG. 4, the control unit (instructed position forcedly move unit) 10 forcedly skips (forcedly moves) the presently instructed position P, such as (x10, y10), (x20, y20), (x30, y30), of a button center position B of a new button image 6 determined at S2. Subsequently, at S5, the control unit 10 (selected-state area highlight unit) causes indication of the highlighted image R on the button image 6, to which the present instructed position P is presently skipped, thereby to specify that the button image 6 is presently in the selected state.

At subsequent S6, the control unit 10 determines whether the present instructed position P is inside the button image 6. The present determination can be made by determining whether the minimum distance D between the present instructed position P and the button image 6, which is presently in the selected state, is 0. Similarly to the processing at S1, the control unit 10 calculates the Δx and the Δy between the present instructed position P and the button image 6, which is presently in the selected state. Subsequently, the control unit 10 determines whether both the Δx and the Δy are 0 or less to determine whether the present instructed position P is inside the button image 6. Thus, the processing proceeds to S7.

At S7, when the control unit 10 determines that the present instructed position P is inside the button image 6, the processing proceeds to S8. At S8, the control unit 10 reads the button widths Sx, Sy corresponding to the button image 6 determined at S2 from the button data shown in FIG. 9. On the other hand, at S7, when the control unit 10 determines that the present instructed position P is not inside the button image 6, the processing proceeds to S13. At S13, the control unit 10 reads predetermined values Sxw, Syh as button width Sx and Sy from the button data of FIG. 9.

Subsequently, at S9, the control unit 10 detects operation quantities Jx, Jy of the operation knob 200. Specifically, the control unit 10 obtains coordinate data (instructed position information) of the instructed position P from the control unit 20. The control unit 10 further, calculates a difference between the presently obtained coordinate data and previous coordinate data (instructed position information) of the instructed Position P already received immediately before and stored by the control unit 10. Thus, the control unit 10 detects the operation quantities Jx, Jy. At subsequent S10, the control unit 10 determines the moving speed V (Vx, Vy) of the instructed position P from the following equations with a constant K. The constant K may be common to all the screens and may be different for each screen.

$$Vx = K \cdot Jx \cdot Sx \quad (1)$$

$$Vy = K \cdot Jy \cdot Sy \quad (2)$$

In this way, the control unit 10 sets the moving speed V of the instructed position P on the display surface 30 when the instructed position P passes through the button image 6. Specifically, the control unit 10 sets the velocity component Vx in the x-axis direction to be in proportion to the width Sx of the button image 6, which is being selected, in the x-axis direction. Similarly, the control unit 10 sets the velocity component Vy in the y-axis direction to be in proportion to the width Sy of the button image 6, which is being selected, in the y-axis direction. That is, the moving speed V is set to be quick, as the button width is large. More specifically, the control unit 10 (reference moving speed calculation unit) calculates a reference moving speed (K·Jx) of the instructed position P such that the reference moving speed (K·Jx) becomes higher as the operation quantity Jx of the operation knob 200 becomes larger. In the present example, the control unit 10 calculates the reference moving speed (K·Jx) to be in proportion to the operation quantity Jx. Further, the control unit 10 (moving speed set unit) corrects the calculated reference moving speed (K·Jx) with the width Sx of the button image 6, which is being selected, in the x-axis direction thereby to set the velocity component Vx of the instructed position P in the x-axis direction.

Similarly, the control unit 10 (reference moving speed calculation unit) calculates a reference moving speed (K·Jy) of the instructed position P such that the reference moving speed (K·Jy) becomes higher as the operation quantity Jy of the operation knob 200 becomes larger. In the present example, the control unit 10 calculates the reference moving speed (K·Jy) to be in proportion to the operation quantity Jy. Further, the control unit 10 (moving speed set unit) corrects the calculated reference moving speed (K·Jy) with the width Sy of the button image 6, which is being selected, in the y-axis direction thereby to set the velocity component Vy of the instructed position P in the y-axis direction. In the case of FIG. 4, when the instructed position P is on the button image 6a, 6b, or 6e, the moving speed V is V (Vx1, Vy1). Alternatively, when the instructed position P is on the button image 6c or 6f, the moving speed V is V (Vx1, Vy2). Alternatively, when the instructed position P is on the button image 6i, the moving speed V is V (Vx2, Vy2).

Alternatively, when the instructed position P is in a button-outside region, which is other than the button image 6, on the display surface 30, the control unit 10 sets a button-image-outside speed (selected-area-outside speed) as the velocity components Vx, Vy of the moving speed V of the instructed position P. Specifically, the control unit 10 calculates the button-image-outside speed by respectively multiplying the operation quantities Jx, Jy by the certain value K and the certain values (selected-area-outside-speed coefficients) Sxw, Syh.

At subsequent S11, the control unit 10 determines whether the set moving speed V of the instructed position P is greater than a predetermined upper limit VU. When the control unit 10 determines that the set moving speed V is greater than the predetermined upper limit VU, the control unit 10 sets the moving speed V of the instructed position P to the upper limit VU. Alternatively, when the moving speed V is less than a predetermined lower limit VD, the control unit 10 sets the moving speed V of the instructed position P to the lower limit VD. When the moving speed V is neither greater than the predetermined upper limit VU nor less than a predetermined lower limit VD, the control unit 10 maintains the moving speed V of the instructed position P calculated at S10 as it is. As shown in FIG. 10, the memory of the control unit 10 stores the upper and lower limit, values VU, VD. The control unit 10 makes the determinations and sets the speed according to the stored upper and lower limit values VU, VD. In the present embodiment, the velocity component Vx of the moving speed V of the instructed position P in the x-axis direction and the velocity component Vy of the moving speed V of the instructed position P in the y-axis direction are respectively set at the upper limit values VUx, VUy and the lower limit values VDx, VDy. Thereby, the velocity component Vx and the velocity component Vy are restricted from being greater of less than the upper and lower limit values.

Summarizing, the example of FIG. 10 includes correction of the moving speed of the pointer with the upper limit and the lower limit. Specifically, when an operability of the instructed position (pointer) is impaired due to excessive moving speed V (Vx, Vy) or insufficient moving speed V (Vx, Vy), the upper limit or the lower limit is set to the moving speed V. The upper limit and the lower limit may be common to the all screens and may be individually set to each of the screens.

At S12, the control unit 10 moves the instructed position P at the moving speed V, which is set at S10 and S11, from a start position to an end position. The start position corresponds to, coordinates detected immediately before. The end position corresponds to coordinates being newly detected. Thus, the processing returns to S1. When the instructed position is skipped to the center position of a button at S4, the instructed position P is moved from the center position as the start position. Therefore, a travel time required for the instructed position P to pass through the button image 6 is shortened.

Figure 11:
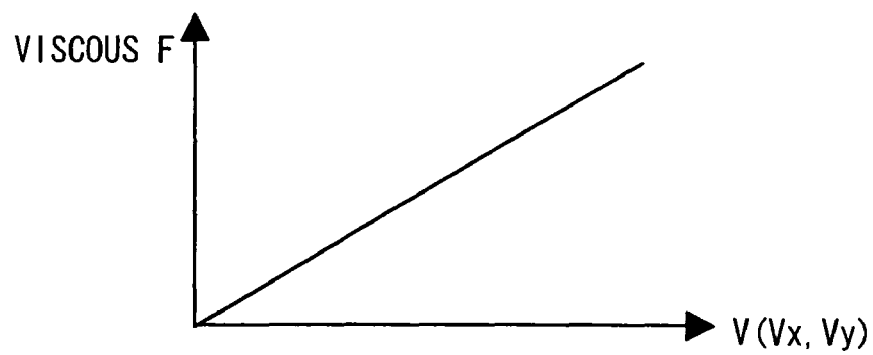
FIG. 11 is a view showing determination of a counter force (viscous counter force) applied to the operation unit.

In the present condition, the control unit 20 of the operation device 2 may cause a counter force F, such as a viscous counter force and/or an oscillation counter force, F to the operation knob 200 according to the moving speed V and the position of the instructed position P, so as to return the operation knob 200 to the neutral position. In the present example, the control unit 20 (counter force control unit) obtains moving speed information, which reflects the moving speed V set at S10, S11, from the control unit 10. The control unit 20 further sets the counter force F (Fx, Fy) according to the moving speed V (Vx, Vy) of the instructed position P. Thus, the control unit 20 further drives the counter force generation units 24, 25. Specifically, as shown in FIG. 11, the control unit 20 sets the counter force F (Fx, Fy) so that the counter force becomes larger as the moving speed V (Vx, Vy) of the instructed position P becomes larger. For example, the control unit 20 may set the counter force F (Fx, Fy) to be in proportion to the moving speed V (Vx, Vy). A reference counter force is set to be lager as the movement of the operated operation knob 200 from the neutral position become larger. In the present example, the reference counter force is set to be in proportion to the movement of the operated operation knob 200 from the neutral position. Alternatively, the counter force F (Fx, Fy) may be set such that the reference counter force is set to be greater as the moving speed V (Vx, Vy) of the instructed position P becomes larger.

Figure 12:
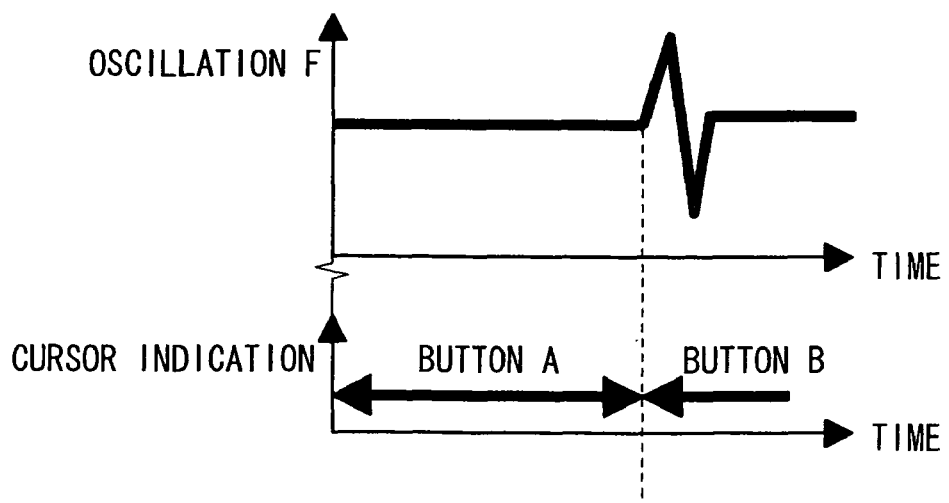
FIG. 12 is a view showing determination of a counter force (oscillation counter force) applied to the operation unit.

When the control unit determines that the button number is changed at S3, the control unit 20 of the operation device 2 determines that the button image 6, which is being selected, is switched to another button image 6, and the highlighted image R is moved to the other button image 6. That is, when the control unit (switch determination unit) determines that the button image 6, which is determined to be in the selected state, is switched to the other button image 6, the control unit 20 determines that the selected button image 6 is switched to another button image 6, and the highlighted image R is moved to the other button image 6. In this case, as shown in FIG. 12, the control unit 20 (oscillation control unit) drives the counter force generation units 24, 25 to cause oscillation (oscillation counter force) so as to add operation feeling to the operation knob 200.

Figure 5:
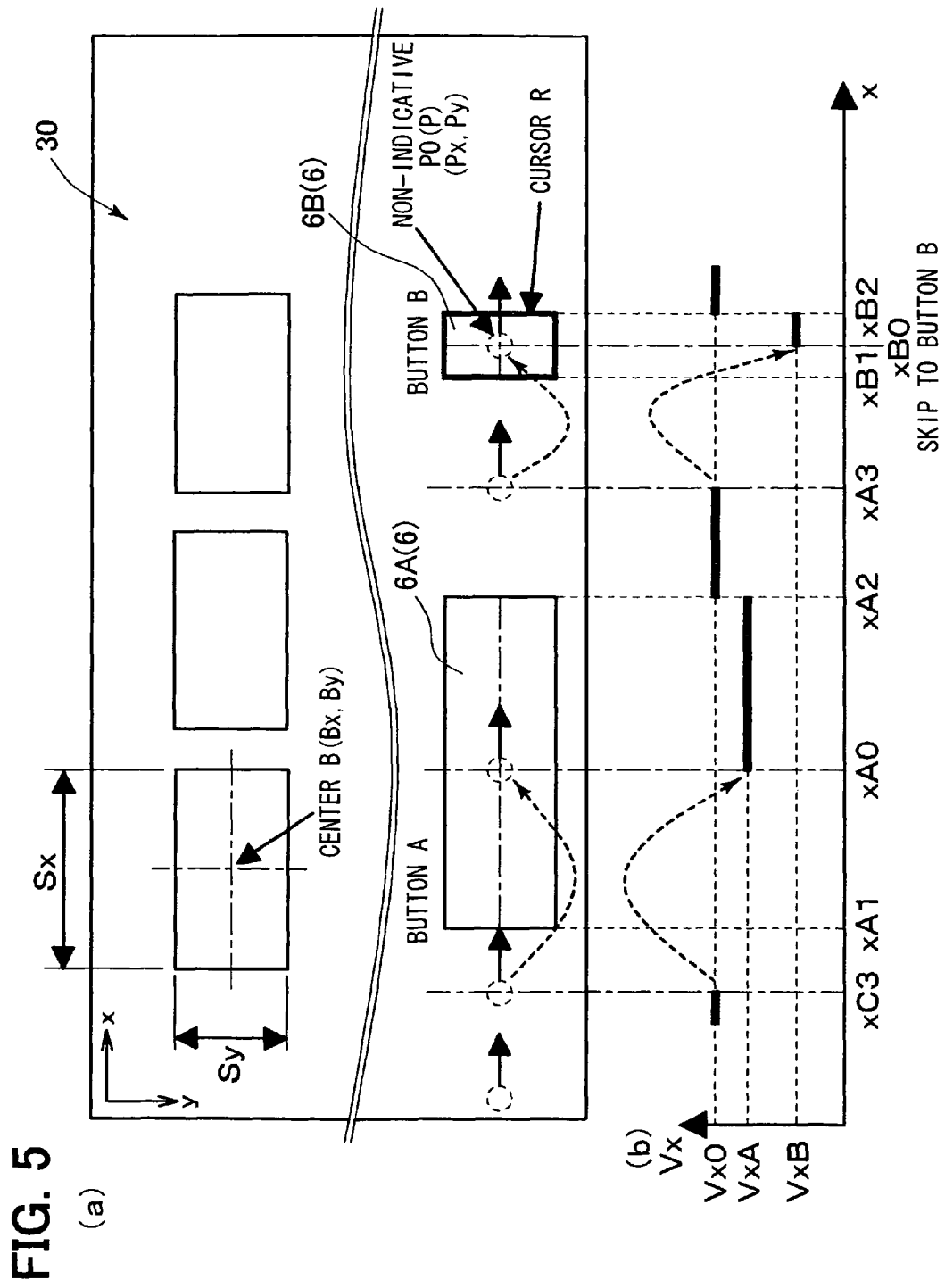
FIG. 5 is a view showing a second example of a relationship between the moving track of the instructed position and the moving speed when the operation unit of FIG. 1 is manipulated.

As follows, a difference between an effect according to the present embodiment and an effect according to a conventional art will be described with reference to FIG. 5. FIG. 5 shows an example of a screen on which a moving speed control of the instructed position P is performed similarly to FIG. 4. In the example of FIG. 5, arrangement of buttons is different from that of FIG. 4. In FIG. 5, the button A (button image 6A) and the button B (button image 6B) having different widths in the x-axis direction or the y-axis direction are arranged. When a user moves the instructed position P to the button B (6B) through the button A (6A), the user is conventionally apt to operate the operation knob 200 with a large operation quantity, since the user wants to move the instructed position P onto the button B (6B) as quickly as possible. In such a case, the moving speed V of the instructed position P increases. Consequently, it is difficult for the user to locate the instructed position P on the target button image 6. In the case of FIG. 5, when a user increases the moving speed of the instructed position P so as to quickly pass through the button A (6A) with the large width, the instructed position P is apt to pass over the button B (6B) with the small width. Therefore, it is difficult for a user to locate the instructed position P within the button B (6B).

Contrary to the conventional case, according to the present embodiment, the moving speed V of the instructed position P becomes higher on the button A (6A) with the large width, without increase in the operation quantity. Thereby, the instructed position P is restricted from passing over the button B (6B). Further, in the case of FIG. 5, when the instructed position P approaches the button. A (6A) among the button images 6 to be closest to the button A (6A), the instructed position P is skipped to the center of the center of the button A (6A), similarly to the case of FIG. 4. Specifically, as shown by (B) of FIG. 5, the instructed position is skipped to the next button (button B) at a middle point between the button A and the button B. Thereby, the movement of the instructed position P is reduced to half. Thus, the instructed position P can be quickly moved to the button B (6B) without increase in the operation quantity.

Figure 6:
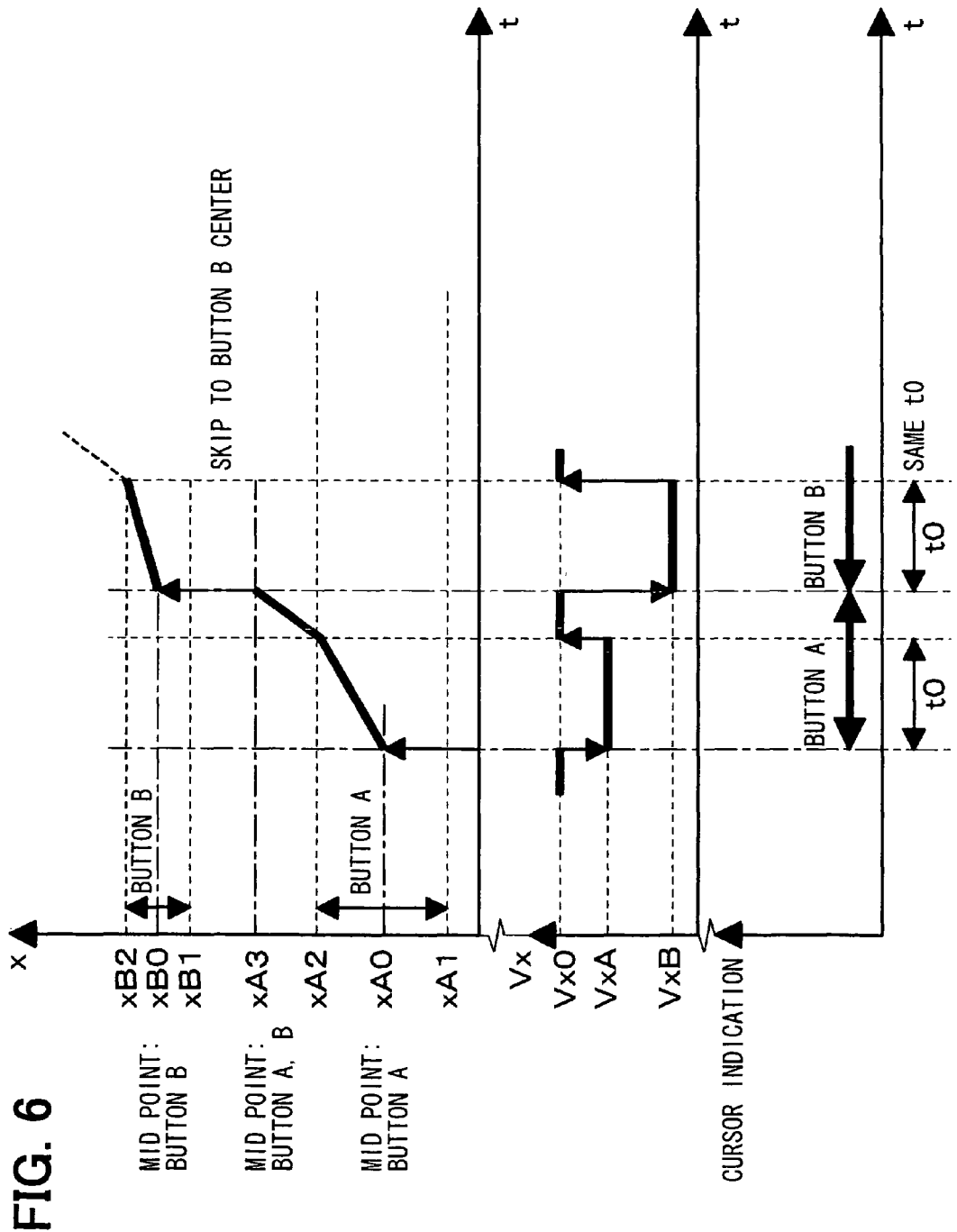
FIG. 6 is a view showing, movement of the instructed position, the moving speed, and a cursor indication state of FIG. 5.

In addition, the moving speed V is determined in proportion to the button width. In the case of FIG. 5, it is supposed that the instructed position P is moved by the same operation quantity through the button A (6A) with the large width and the button B (6B) with the small width. In this case, as shown in FIG. 6, a time period t0 required to pass through the button A (6A) with the large width is the same as a time period t0 required to pass through the button B (6B) with the small width. Thus, the highlighted image R (cursor) is indicated for the same time period t0 in both the cases. In the present example of FIG. 6, the moving speed of the instructed position (pointer) is changed according to the width of the button. Therefore, the time period t0, in which the pointer is in the button A or the button B, is constant. In addition, in the present example, as shown by the upper chat in FIG. 6, the pointer is skipped to the center position of the button B. Therefore, the time period required for, the pointer to pass through the button B can be reduced to half.

In the embodiment, the instructed position P may be indicated with a pointing image P1 such as a pointer. Nevertheless, in the present example, the instructed position P is not indicated. The reason is as follows. The moving speed V of the instructed position P is variable according to a factor other than the operation quantity. Therefore, a moving track of the instructed position P does not coincide with the operation direction of the operation knob 200. In consideration of this, the instructed position P is not indicated, and only the highlighted image R (cursor) is indicated, so as not to let a user have an uncomfortable feeling.

The operation device 2 according to the present embodiment is a remote operation unit, which enables a remote control instead of a main operation unit. The main operation unit is, for example, a touch panel provided on the display surface 30 of the display unit 3, a hardware switch device provided around the touch panel, and/or the like. The operation device 2 is located at a predetermined position closer to an occupant's seat so as to reduce operation burden of a user compared with that of the main operation unit. In the present example, as shown in FIG. 2, the operation device 2 is a hand-side operation unit located at a position such that the operation device 2 is operable by both users (occupants) seated on a driver seat and a passenger seat and leaned on the backrests of the seats. More specifically, the operation device 2 is located at a region (center console) C interposed between both seats in the vehicle. In this example, the operation device 2 is located between the driver seat and the passenger seat. The display unit 3 has the display surface (distant display surface) 30 around the instrument panel I on the front side of the operation device 2 relative to the vehicle. The display surface 30 is viewable from both users seated on the seats.

Figure 13:
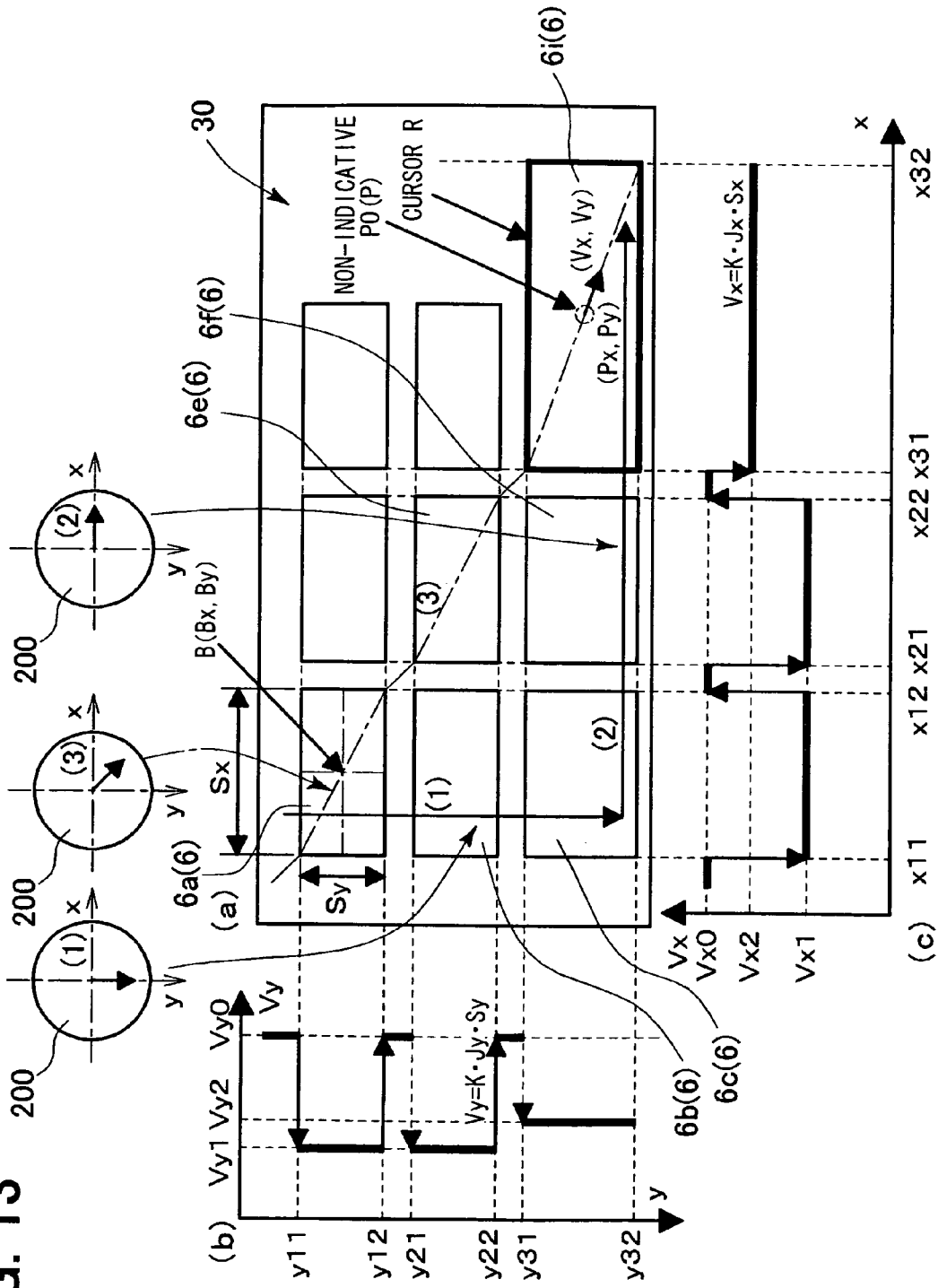
FIG. 13 is a view showing a third example of a relationship between the moving track of the instructed position and the moving speed when the operation unit of FIG. 1 is manipulated.
Figure 14:
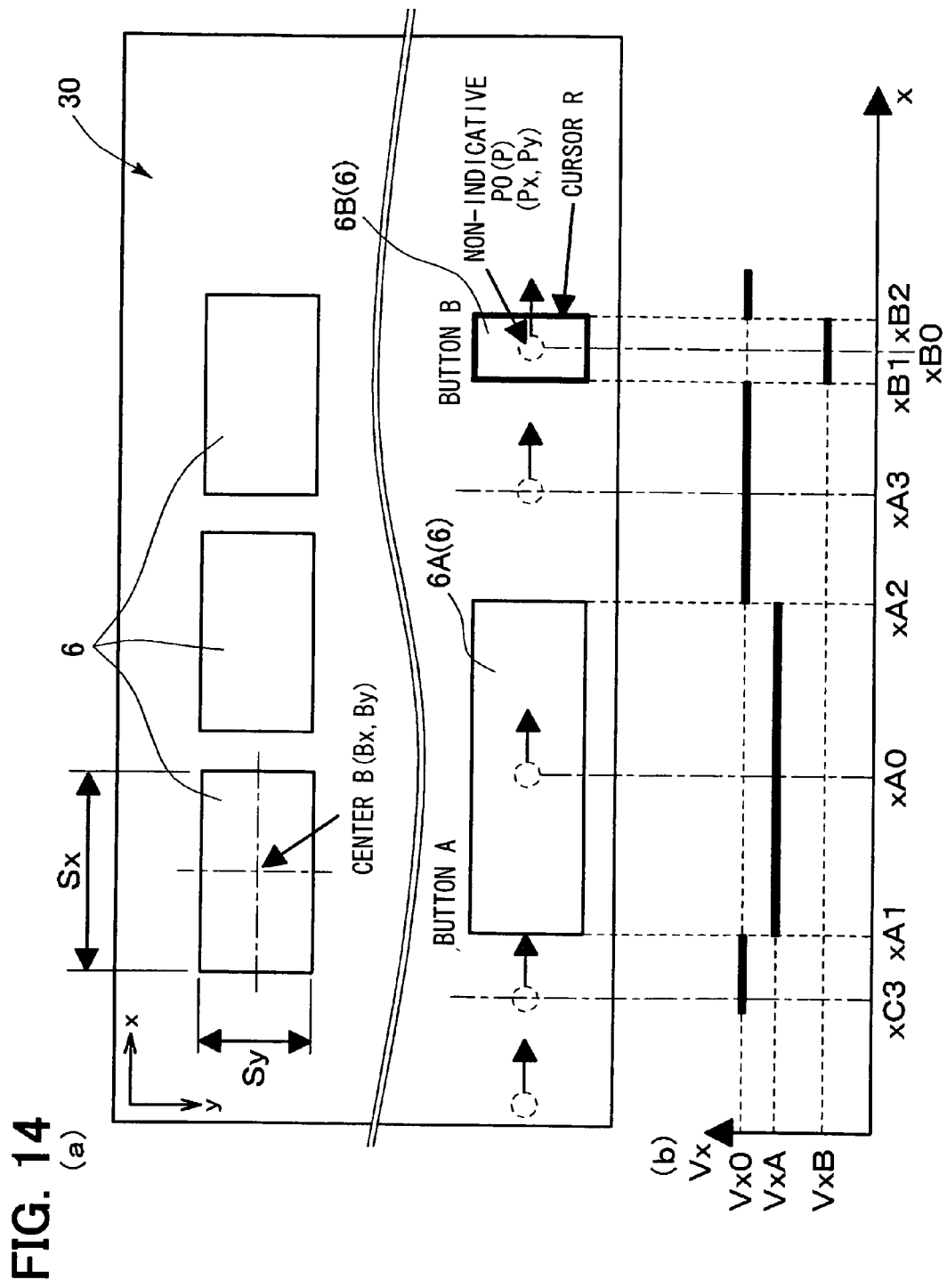
FIG. 14 is a view showing a fourth example of a relationship between the moving track of the instructed position and the moving speed when the operation unit of FIG. 1 is manipulated.
Figure 15:
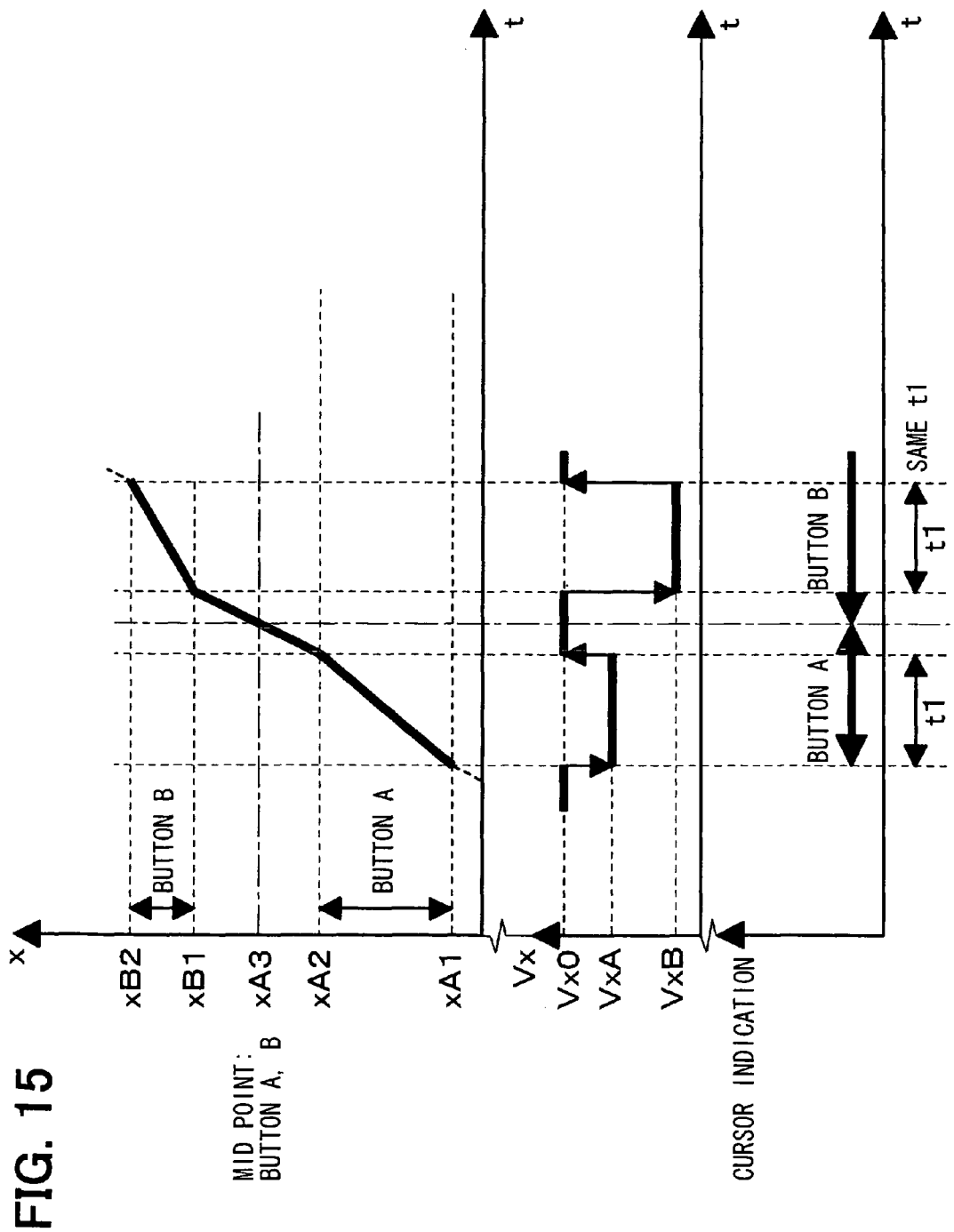
FIG. 15 is a view showing movement of the instructed position, the moving speed, and a cursor indication state of FIG. 14.

One embodiment of the present invention is described above. It is noted that the one embodiment is an example of the present invention. The present invention is not limited to the one embodiment and may be arbitrary modified to various forms by skilled person as long as being in the gist of the present invention. As follows, other embodiments will be described:

For example, in the above embodiment, as the highlighted image R (cursor) is moved to another button image 6, the instructed position P is skipped to the center position of the button image 6 where the instructed position P is to be moved. Alternatively, as shown in FIGS. 13 to 15, the skip may be omitted. In the embodiment of FIGS. 13 to 15, the instructed position P (P0) is not indicated on the display surface 30. As shown in FIG. 15, a time period, in which the instructed position P is on the button image 6, is the time period t1, which is the same among the button images 6. In the present example of FIG. 15, the moving speed of the instructed position (pointer) is changed according to the width of the button. Therefore, the time period t1, in which the pointer is in the button A or the button B, is constant.

Figure 16:
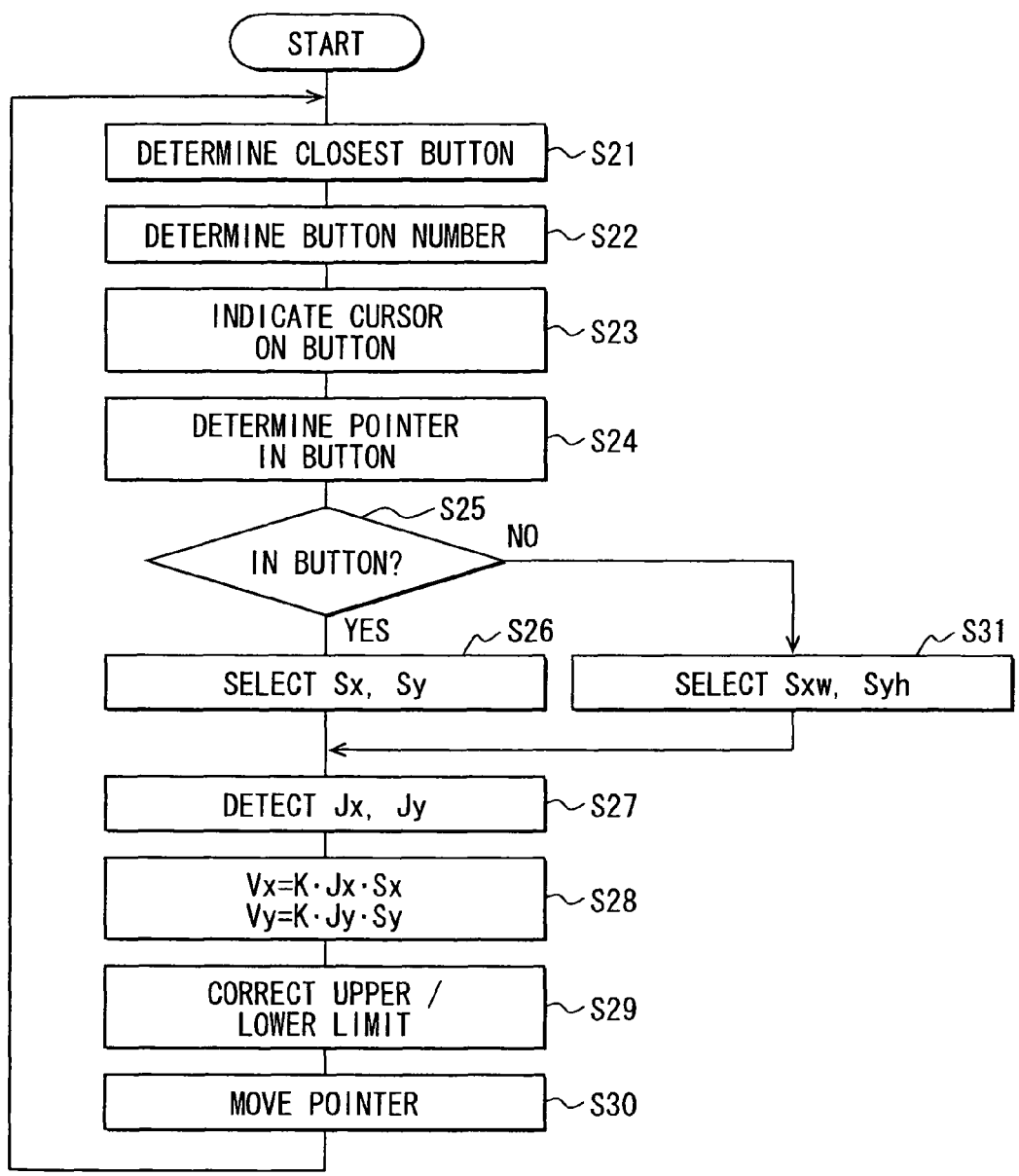
FIG. 16 is a flow chart which showing a moving speed control of the instructed position in FIGS. 13, 14.

The control unit 10 performs the control of the moving speed V of the instructed position P in the case of FIGS. 13 to 15 in a manner of a flowchart shown in FIG. 16, for example.

In the present example, at S21, the control unit 10 evaluates a button image 6, to which the present instructed position P is in a closest position. At S22, the control unit 10 determines the button image 6 closest to the present instructed position P according to the evaluation result. On determination, the control unit 10 stores the button image 6 as a cursor-indicated button to be identifiable. The present processings are similar to S1, S2 in FIG. 7.

At subsequent S23, the highlighted image R is indicated on the determined button image 6 to specify that the determined button image 6 is in the selected state. At S24, it is determined whether the present instructed position P is inside the button image 6. At S24, when it is determined that the present instructed position P is inside the button image 6, the processing proceeds from S25 to S26. At S26, the button widths Sx, Sy corresponding to the button image 6 determined at S22 is read from the button data shown in FIG. 9. On the other hand, at S24, when it is determined that the present instructed position P is not inside the button image 6, the processing proceeds from S25 to S31. As S31, the predetermined values Sxw, Syh are read as button width Sx and Sy from the button data of FIG. 9. Subsequently, at S27, the operation quantities Jx, Jy of the operation knob 200 are detected.

At subsequent S28, the moving speed V (Vx, Vy) of the instructed position P is determined from the equation (1) and the equation (2). Calculation of the moving speed V (Vx, Vy) of the instructed position P in a region outside the button is the same as the calculation described in the above embodiment. Specifically, the operation quantities Jx, Jy may be respectively multiplied by the certain value K and the certain values Sxw, Syh to calculate the values Vx, Vy of the moving speed V of the instructed position P. In this way, the button-image-outside speed (selected-area-outside speed) may be set.

At subsequent S29, the calculated moving speed V (Vx, Vy) of the instructed position P is corrected with the upper limit VU and the lower limit VD, which are set as needed. At S30, the instructed position P is moved at the moving speed V, which is set at S28 and S29, from a start position to an end position. The start position corresponds to coordinates detected immediately before. The end position corresponds to coordinates being newly detected. Thus, the processing returns to S21, and the processing is repeated. The processings at S23 to S31 are similar to the processings at S5 to S13 in FIG. 7.

In the above embodiment, the control unit 10 calculates the velocity components Vx, Vy of the moving speed V of the instructed position P in the region outside the button by respectively multiplying the operation quantities Jx, Jy by the certain value K and the certain values Sxw, Syh, thereby to obtain the button-image-outside speed (selected-area-outside speed).

Figure 17:
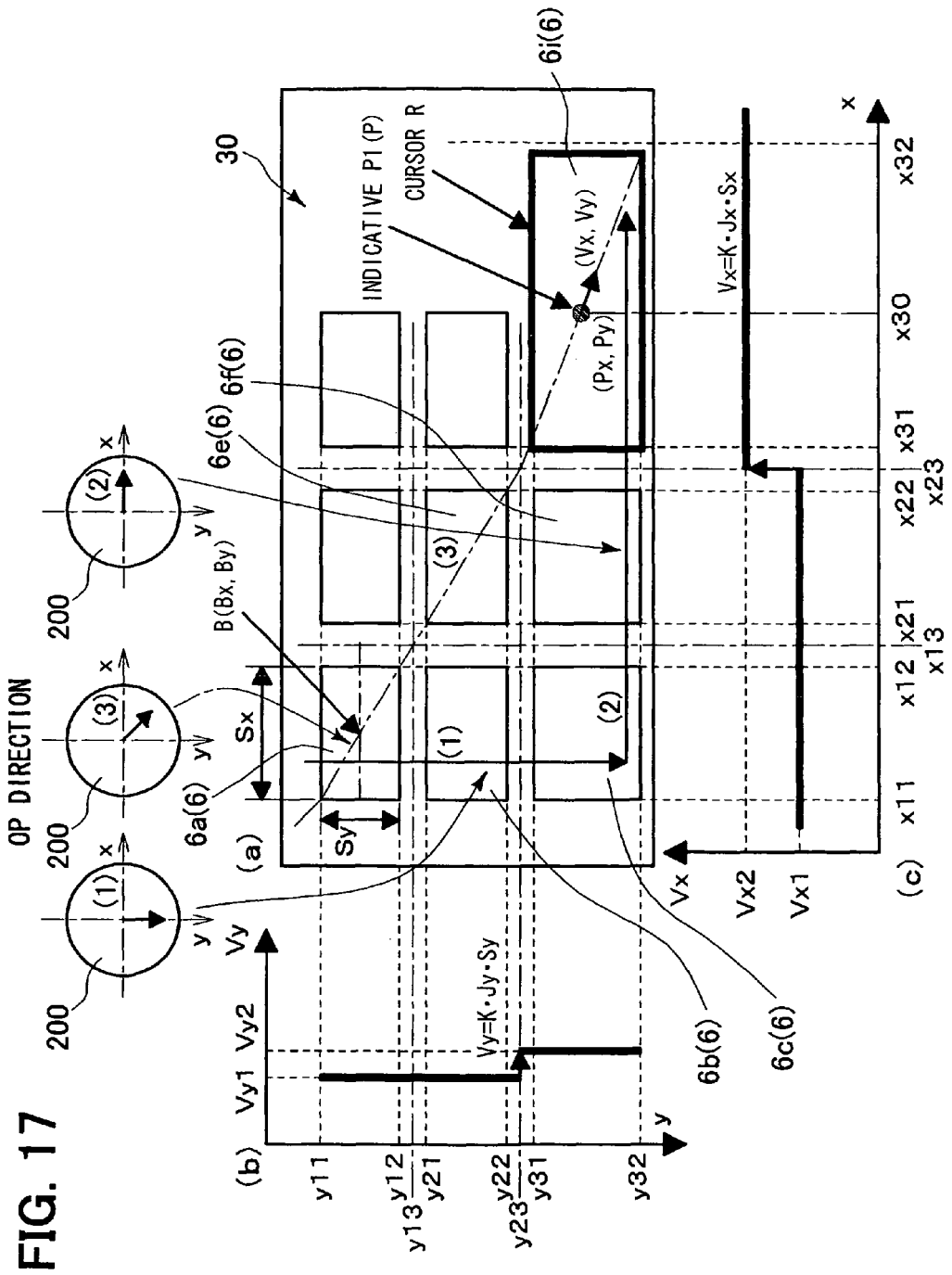
FIG. 17 is a view showing a fifth example of a relationship between the moving track of the instructed position and the moving speed when the operation unit of FIG. 1 is manipulated.
Figure 18:
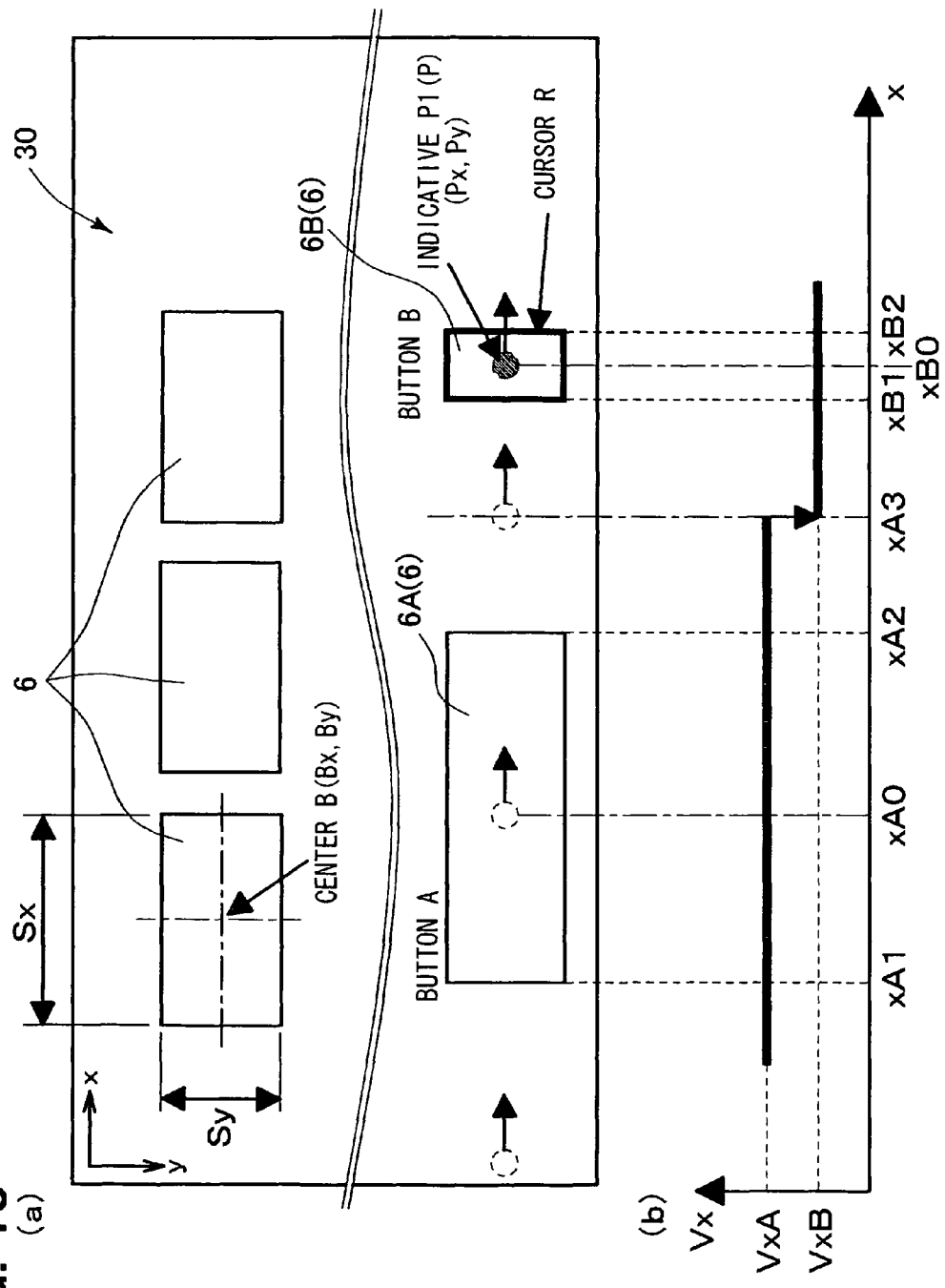
FIG. 18 is a view showing a sixth example of a relationship between the moving track of the instructed position and the moving speed when the operation unit of FIG. 1 is manipulated.
Figure 19:
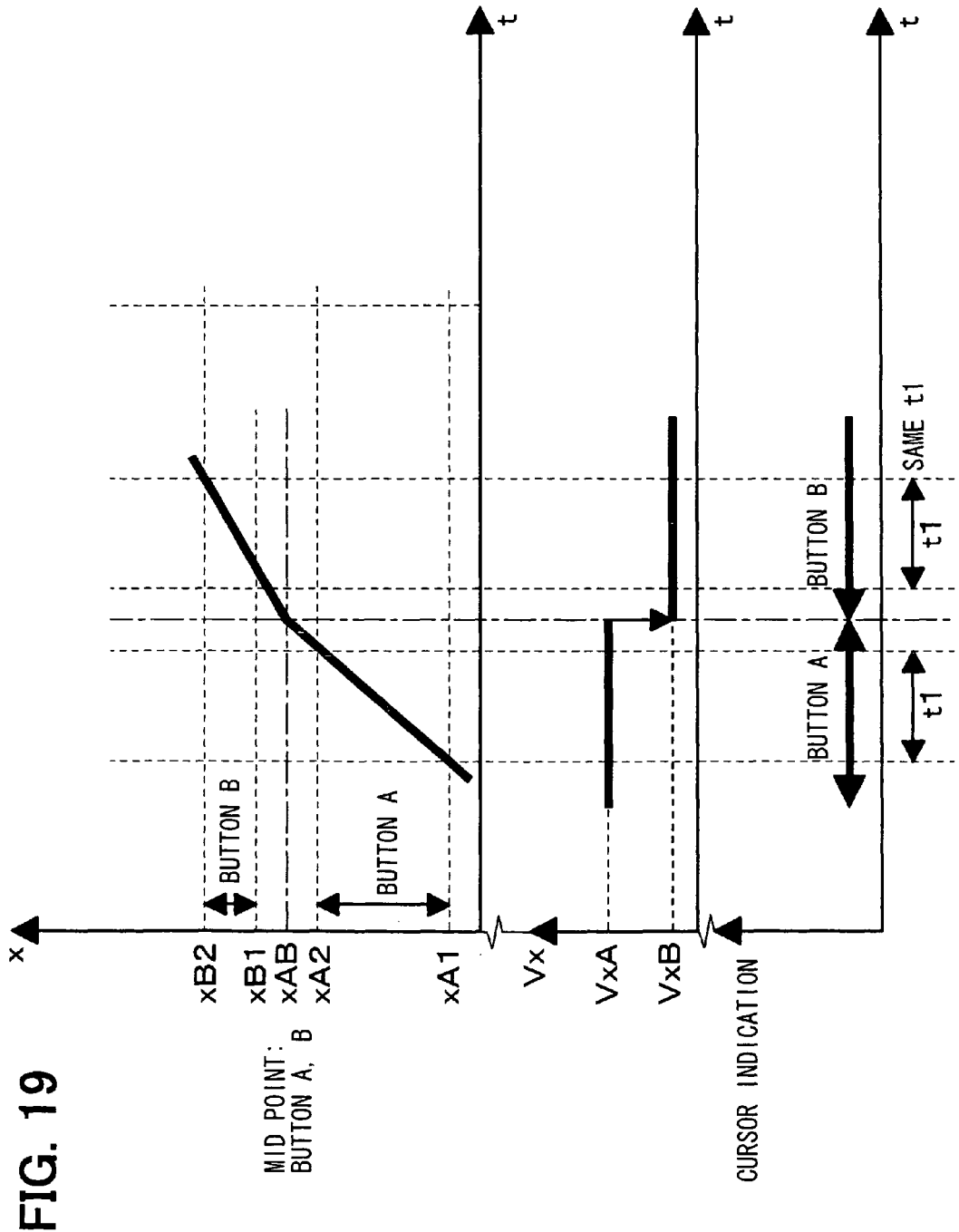
FIG. 19 is a view showing movement of the instructed position, the moving speed, and a cursor indication state of FIG. 18.

Alternatively, as shown in FIGS. 17 to 19, the control unit (closest selective area determination unit) may determine a closest button image 6, which is the closest to the instructed position P, among the multiple button images 6 on the display surface 30. In addition, the control unit (moving speed set unit) may set the moving speed V when the instructed position P is in the button image 6, which is determined to be closest, to the moving speed V of the instructed position P in a region other than the multiple button images 6 on the display surface 30. In this case, the instructed position P moves on a moving track closer to the operation direction compared with the case in the above embodiment. Therefore, for example, the control unit 10 (pointing image indication unit) may execute a processing shown in FIG. 28 to cause the display unit 3 to indicate the pointing image (pointer) P1 representing the instructed position P on the display surface 30. In the present example of FIG. 19, the moving speed of the instructed position (pointer) is changed according to the width of the button. Therefore, the time period t1, in which the pointer is in the button A or the button B, is constant.

Figure 20:
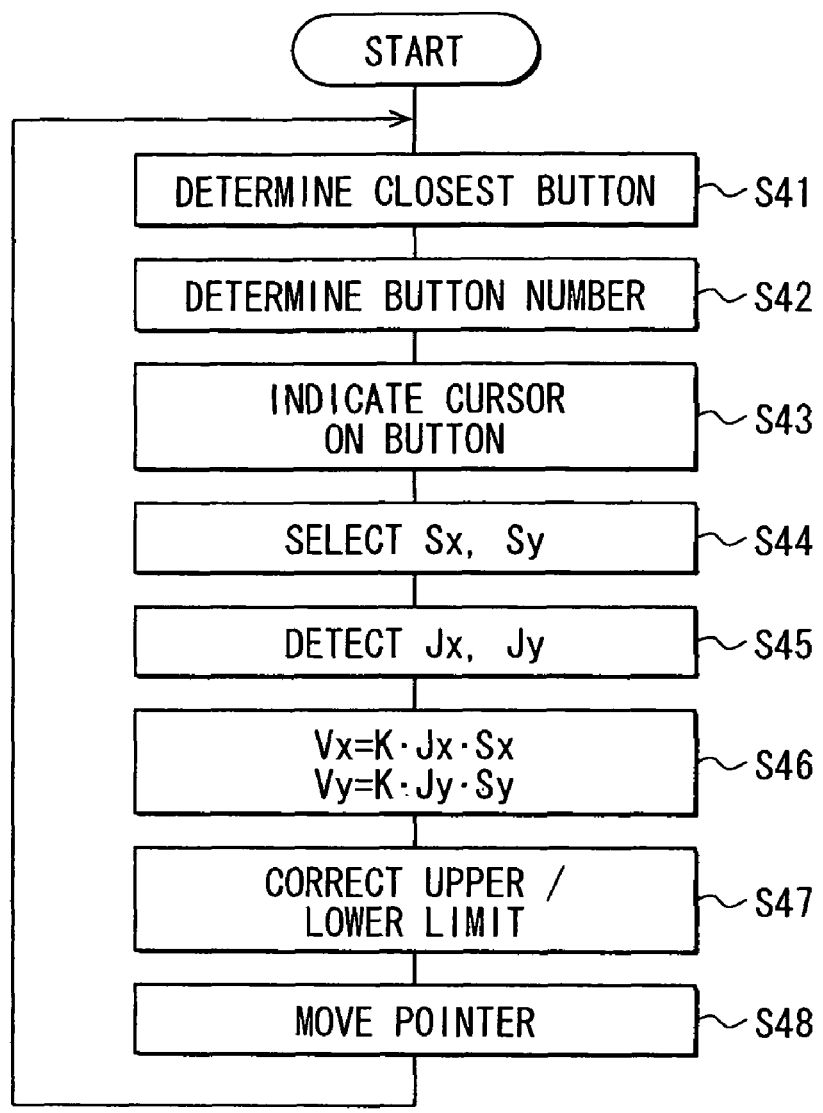
FIG. 20 is a flow chart which showing a moving speed control of the instructed position in FIGS. 17, 18.

The control unit 10 performs the control of the moving speed V of the instructed position P in the case of the example of FIGS. 17 to 15 in a manner of a flowchart shown in FIG. 20, for example. The flowchart of FIG. 20 is formed by omitting the processings of S24, S25, S31 from the flowchart of FIG. 16.

Figure 21:
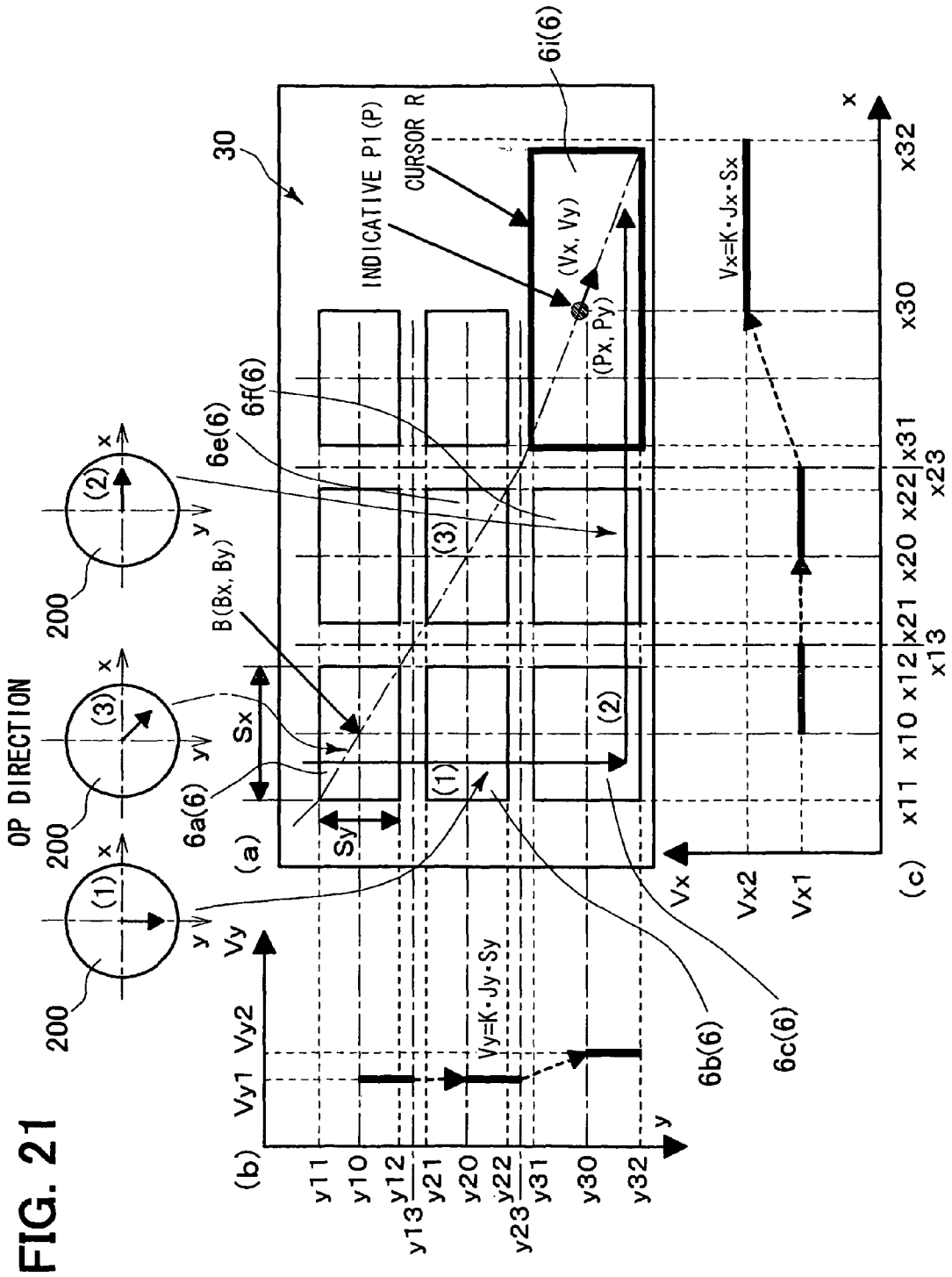
FIG. 21 is a view showing a seventh example of a relationship between the moving track of the instructed position and the moving speed when the operation unit of FIG. 1 is manipulated.
Figure 22:
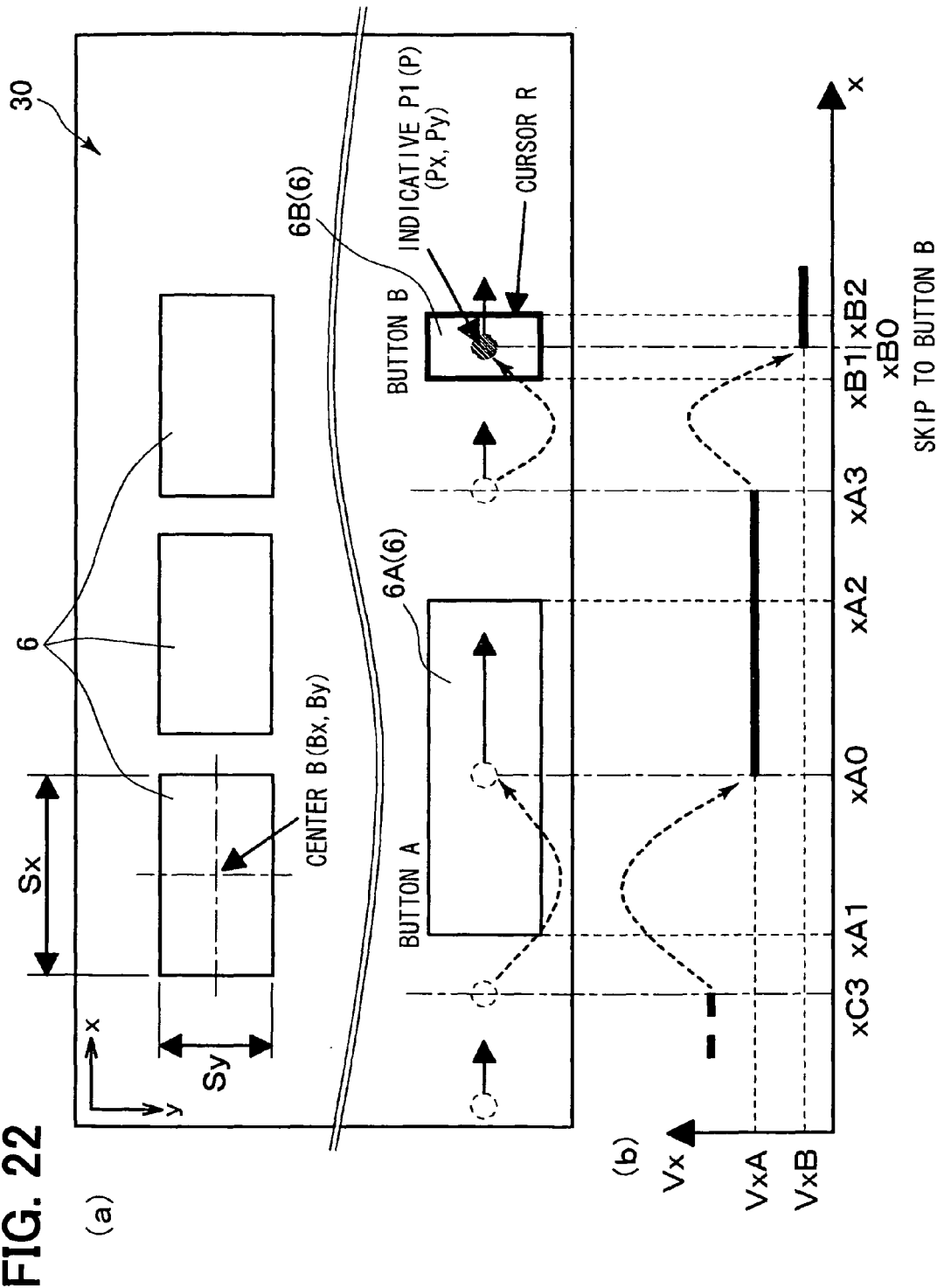
FIG. 22 is a view showing a eighth example of a relationship between the moving track of the instructed position and the moving speed when the operation unit of FIG. 1 is manipulated.
Figure 23:
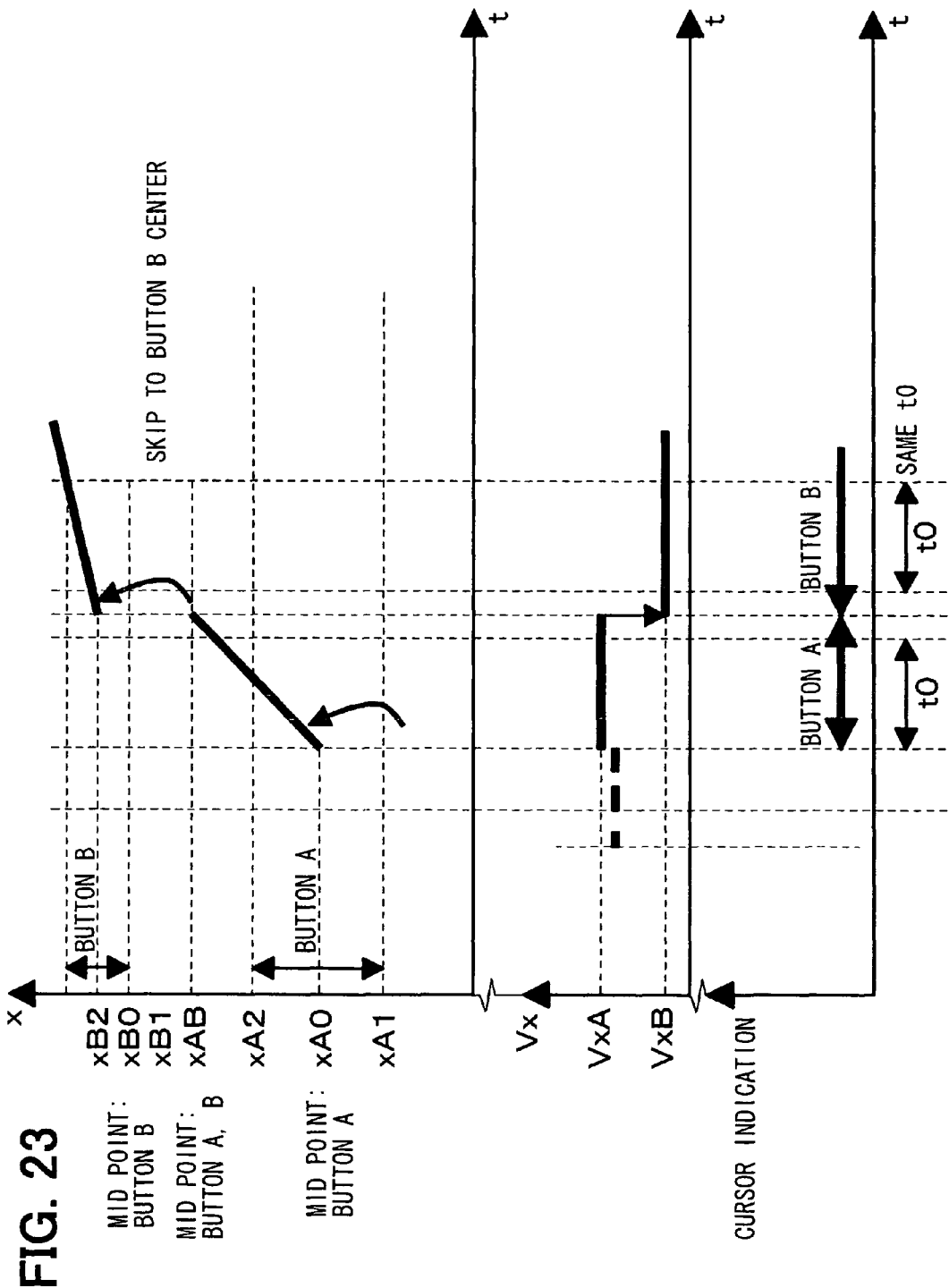
FIG. 23 is a view showing movement of the instructed position, the moving speed, and a cursor indication state of FIG. 22.
Figure 24:
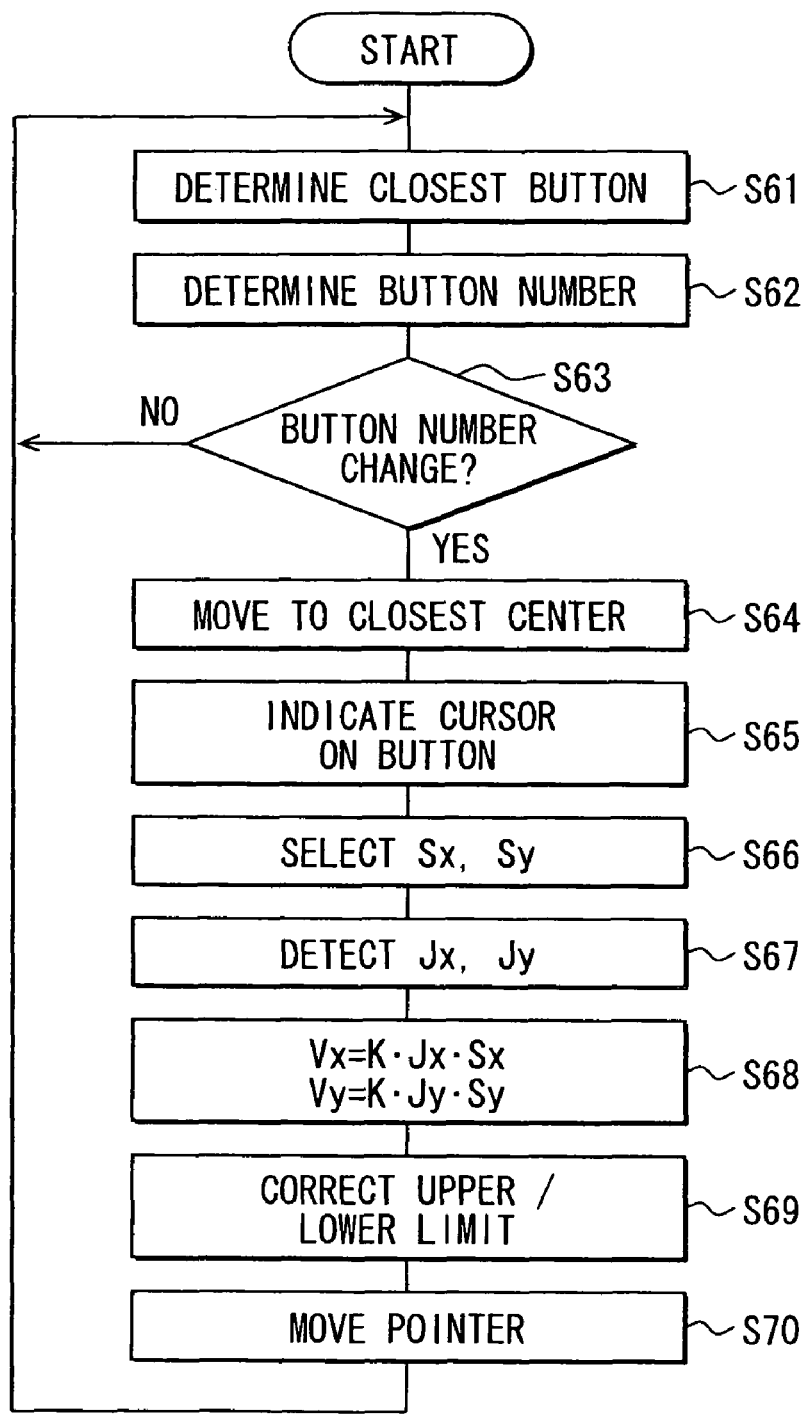
FIG. 24 is a flow chart which showing a moving speed control of the instructed position in FIGS. 22, 23.

The example of FIGS. 21 to 23 is similar to the example of FIGS. 17 to 19 excluding that the instructed position P is skipped to the center position of the button image 6 when the highlighted image R (cursor) is moved to another button image 6 similarly to the example shown in FIGS. 4 to 6. In the present example, the control unit 10 performs the control of the moving speed V of the instructed position P in a manner of S61 to S70 in a flowchart shown in FIG. 24, for example. The processings of S61 to S65 in FIG. 24 are similar to the processings of S1 to S5 of FIG. 7. The processings of S66 to S70 in FIG. 24 are similar to the processings of S44 to S48 of FIG. 20. As shown by (B) of FIG. 22, the instructed position is skipped to the next button (button B) at a middle point between the button A and the button B. In the present example of FIG. 23, the moving speed of the instructed position (pointer) is changed according to the width of the button. Therefore, the time period t0, in which the pointer is in the button A or the button B, is constant. In addition, in the present example, as shown by the upper chat in FIG. 23, the pointer is skipped to the center position of the button B. Therefore, the time period required for the pointer to pass through the button B can be reduced to half.

Figure 25A:
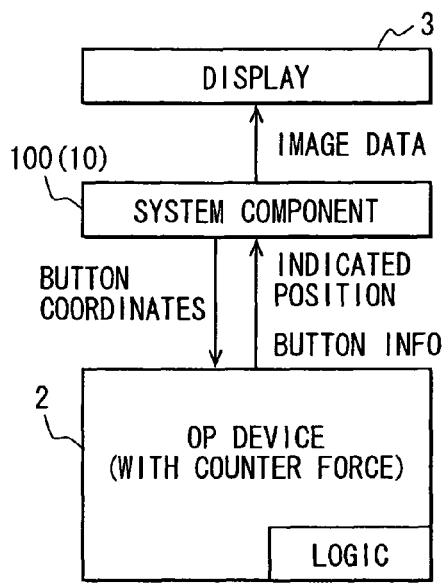
FIG. 25A to 25D are block diagrams each showing a modification of an electric configuration of the vehicular input device according to the embodiment.
Figure 25C:
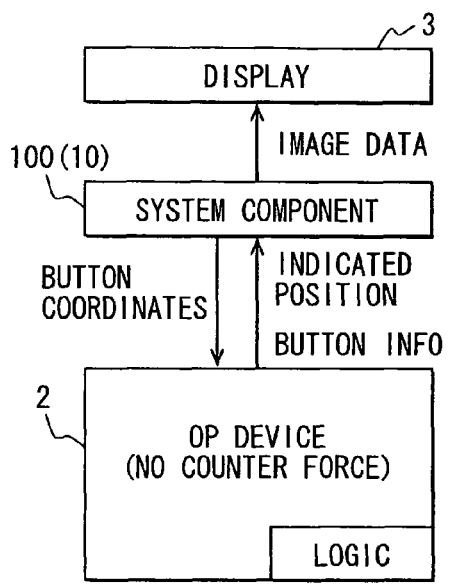

In the above-described embodiments, the control unit 10, which is a main component of the vehicular input device 1, obtains operation information on a moving operation made on the operation knob 200 in order to move the instructed position P on the display surface 30. The control unit 20 further determines an operation direction and an operation quantity according to the operation information. The control unit 10 further calculates coordinates, where the instructed position P moves, according to the determined operation direction and the operation quantity. The control unit 10 further calculates a moving speed V when the instructed position P moves. The control unit 10 further controls movement of the indicated instructed position P on the display surface 30 according to the calculated coordinates, where the instructed position P moves, and the moving speed. The control unit 10 further performs various controls (various logics), such as application of the counter force (the viscous counter force and the oscillation counter force), according to movement of the instructed position. It is noted that the control unit 20 of the operation device 2 may perform such various controls. For example, as shown in FIG. 25A (with counter force control) and FIG. 25D (no counter force control), the control unit 20 of the operation device 2 may perform the control (processing) of the moving speed V of the instructed position P and the control of the counter force. The control unit 20 may further transmit indication instruction information obtained through the control (processing) to the control unit 10. The obtained indication instruction information includes, for example, information on the coordinates of the instructed position P and the moving speed V of the instructed position P, information (identification information) on the button to be indicated with the highlighted image R, and the like.

Figure 25B:
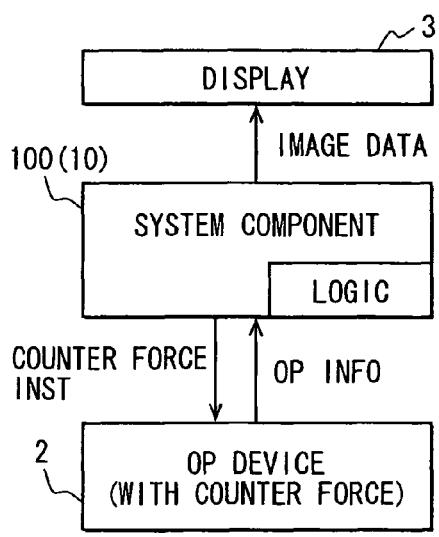
Figure 25D:
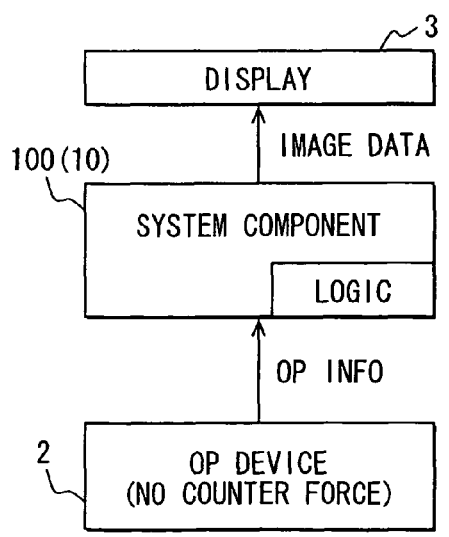

In this case, the control unit 10 may indicate an image on the display surface 30 of the display unit 3 according to the transmitted indication instruction information and the image data. In addition, the control unit 10 may transmit information to the control unit 20 of the operation device 2. The information (button data (location, size)) is, for example, the button data shown in FIG. 9, relevant to indication and required for the operation device 2 to control of the moving speed V of the instructed position P. Alternatively, as shown in FIG. 25B (with counter force control) and FIG. 25D (no counter force control), the control unit 10 may be configured to perform the above-described control of the moving speed V of the instructed position P. The control unit 10 may be further configured to determine counter force instruction information and perform the counter force control. In this case, the control unit 10 may transmit the determined counter force instruction information to the operation device 2 and cause the operation device 2 to drive the counter force generation units 24, 25. Thus, the control unit 10 may input operation information based on operation of the operation knob 200.

According to the above embodiments, multiple button images 6 are arranged and indicated. In addition, the button operation screen with the instructed position P (non-indicative (P0)) or the instructed position P (indicative (P1)) is indicated entirely in the display surface 30.

Figure 26A:
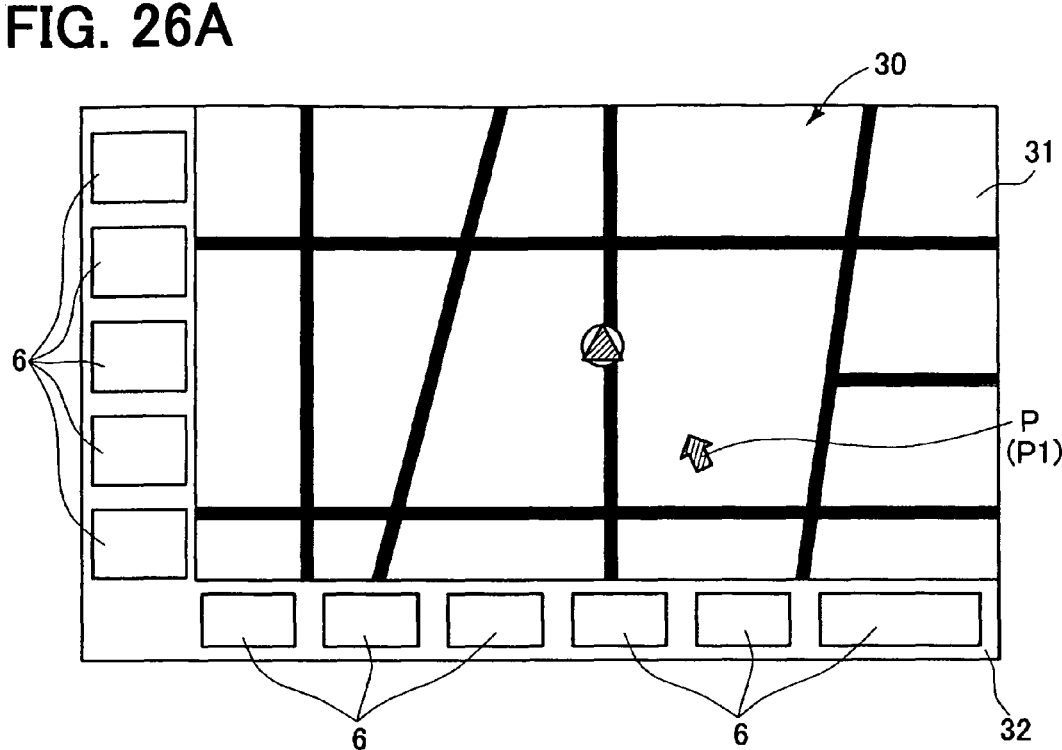
FIGS. 26A, 26B are views each showing an example of a screen in which a pointer indication and a button cursor indication are switched to each other.
Figure 26B:
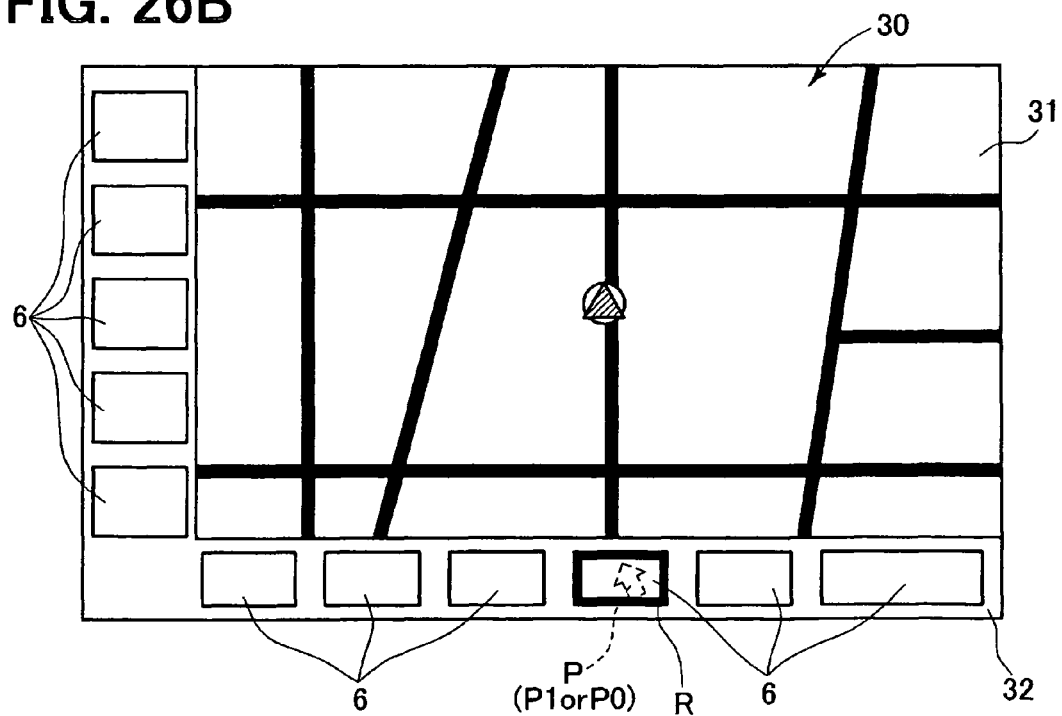

Alternatively, as shown in FIGS. 26A, 26B, the control unit 10 may cause the display unit 3 (instructed position switch screen indication unit) to indicate an instructed position switch screen on the display surface 30. The instructed position switch screen may include an instructed position image indication region (pointer indication region) 31 and a highlighted image indication region (cursor indication region) 32. In the instructed position image indication region 31, the instructed position P is indicated as the pointing image (pointer) P1. In the highlighted image indication region 32, the highlighted image (cursor) R is indicated on the button image (selected-state area) 6, which is being selected by the instructed position P.

Figure 27:
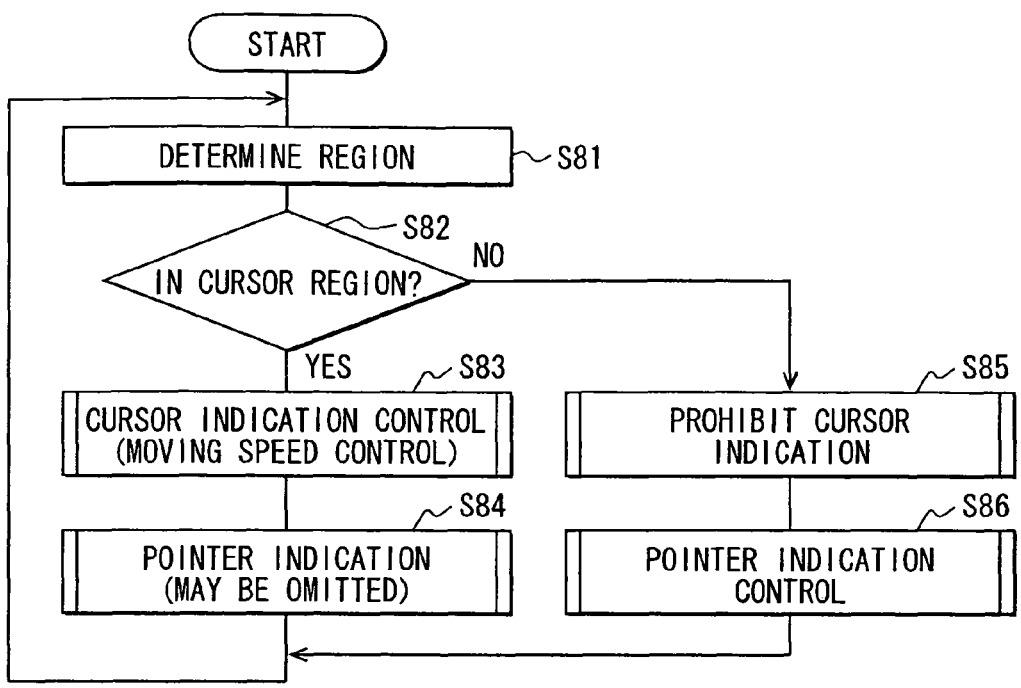
FIG. 27 is a flow chart showing an instructed position indication control for indicating the screens of FIGS. 26A, 26B.
Figure 28:
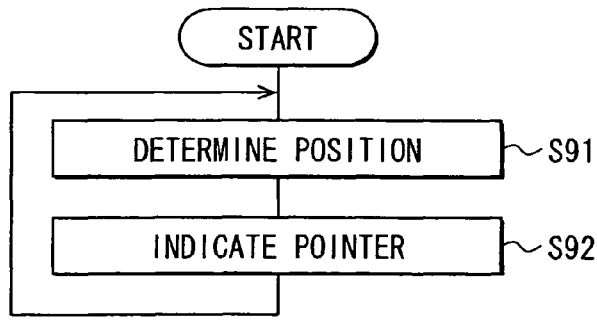
FIG. 28 is a flow chart showing a pointer indication control.

In this case, the display control of the instructed position P may be performed in a manner shown by the flowchart of FIG. 27, for example. At S81, the control unit (S81: instructed region determination unit) 10 first determines one of the instructed position image indication region 31 and the highlighted image indication region 32 on which the instructed position P is located. The instructed position image indication region 31 and the highlighted image indication region 32 are adjacent to each other. The internal memory of the control unit 10 or the external storage device (not shown) beforehand stores region classification determination information for determining one of the instructed position image indication region 31 and the highlighted image indication region 32. The region classification determination information is associated with each screen. Therefore, the control unit 10 makes the determination according to the region classification determination information corresponding to the presently indicated screen and the present coordinates (instructed position information) of the instructed position P. The determination result is stored in the internal memory of the control unit 10. When the control unit 10 determines that the instructed position P is inside the highlighted image indication region 32 (S82: Yes), the control unit 10 performs the above-described control of the moving speed V of the instructed position P. Thereby, at S83, the control unit (S83: instruction image indication switch unit) 10 causes indication of the highlighted image R shown in FIG. 26B. In addition, the control unit 10 prohibits indication of the pointing image P1 and renders the pointing image P1 non-indicative (P0). In this case, the processing of S84 is omitted. The pointing image P1 may be indicated when being inside the highlighted image indication region 32. In this case, at S84, the control unit 10 performs the indication control of the pointing image P1 simultaneously. For example, as shown in FIG. 28, at S91, the control unit 10 determines the present coordinates of the instructed position P. Further, at S92, the control unit 10 indicates the predetermined pointing image P1 at the instructed position thereby to perform the indication control of the pointing image P1 Alternatively, when the control unit 10 determines that the instructed position P is inside the instructed position image indication region 31 (S82: No), the processing proceeds to S85. At S85, the control unit 10 prohibits indication of the highlighted image (cursor) R and renders the highlighted image (cursor) R non-indicative. Further, at S86, the control unit 10 performs the indication control (FIG. 28) of the pointing image P1. Thus, for example, as shown in FIG. 26A, the control unit 10 causes the indication of the pointing image P1 in the instructed position image indication region 31. In this way, the control unit 10 functions as the instruction image indication switch unit. Specifically, the control unit 10 (moving speed set prohibition unit) prohibits the above-described control of the moving speed V of the instructed position P. Thereby, the control unit 10 prohibits the above-described processing to correct the reference moving speed according to the width (Sx, Sy) of the button image 6, which is being selected, in calculation of the moving speed V of the instructed position P. Thus, the above-described reference moving speed is uses as the moving speed V of the instructed position P. In this way, the control unit 10 indicates the pointing image P1 moved at the reference moving speed V inside the instructed position image indication region 31.

The present operation is applicable to all the above-described embodiments. In this way, indication of the pointing image (pointer) P1 and indication of the highlighted image (cursor) R can be switched smoothly between the instructed position image indication region 31 and the highlighted image indication region 32. The smooth switch is enabled by determining indication of the pointing image P1 in the pointer indication region 31 and indication of the highlighted image R in the cursor indication region 32 according to the coordinates of the instructed position P.

Summarizing the above embodiments, a vehicular input device includes: an indication unit configured to indicate arranged multiple selective areas for accepting input on a display surface on which an x-axis direction and a y-axis direction, which intersect perpendicularly to each other, are assigned; an operation unit configured to move an instructed position on the display surface according to an operation quantity of the operation unit; a selected-state area determination unit configured to determine a selected-state area, which is in a selected state, from the multiple selective areas according to the instructed position; a width determination unit configured to determine a width of the selected-state area in the x-axis direction and a width of the selected-state area in the y-axis direction; and a moving speed set unit configured to set a moving speed of the instructed position variably at least when the instructed position passes through the selected-state area such that a velocity component in the x-axis direction becomes large as the width in the x-axis direction determined by the width determination unit becomes large, and a velocity component in the y-axis direction becomes large as the width in the y-axis direction determined by the width determination unit becomes large.

According to the present configuration, the selective area, which is for accepting input, is indicated on the display surface. In addition, when the instructed position moves on the selective area, the moving speed is determined (changed) according to the size of the selected-state area in the x-axis direction and the size of the selected-state area in the y-axis direction. Specifically, as the width of the selective area in the x-axis direction or the width of the selective area in the y-axis direction becomes large, the instructed position, which is inside the selective area, moves quickly in the direction. Contrary, as the width of the selective area in the x-axis direction or the width of the selective area in the y-axis direction becomes small, the instructed position, which is inside the selective area, moves slowly in the direction. In this way, when the instructed position is in the selective area having a large width, a time period, for which a user is required to wait for the instructed position to pass through the selective area, is reduced. In addition, when the instructed position is in the selective area having a small width, the instructed position can be restricted from quickly passing over the selective area. Thus, operability can be enhanced. Originally, an object of the moving operation of the instructed position is to select a selective area for accepting input. Therefore, existence of the instructed position in the same selective area for a long time period impairs operability. In consideration of this, in the present configuration, the moving speed of the instructed position is determined according to the width of the selective area thereby to enhance operability.

The moving speed set unit may be further configured to: variably set the velocity component of the moving speed of the instructed position in the x-axis direction to be in proportion to the width in the x-axis direction determined by the width determination unit; and variably set the velocity component of the moving speed of the instructed position in the y-axis direction to be in proportion to the width in the y-axis direction determined by the width determination unit.

In this way, a time period, which is required for the pointer to pass through the selective area, becomes constant regardless of the width of the selective area in the x-axis direction and the width of the selective area in the y-axis direction. Therefore, waiting time can be reduced, and the passing over can be avoidable.

The moving speed set unit may be further configured such that: when the moving speed of the instructed position is greater than a predetermined upper limit, the moving speed set unit may set the moving speed at the upper limit; and when the moving speed of the instructed position is less than a predetermined lower limit, the moving speed set unit may set the moving speed at the lower limit.

In general, when the moving speed of the instructed position is too high or too low, operability may be impaired contrary. In consideration of this, the maximum limit and the minimum limit are determined for the moving speed thereby to avoid impairment of operability. The upper limit and the lower limit may be common to all screens and may be changed for each screen. More specifically, the upper limit and the lower limit may be determined for each of the velocity component of the moving speed of the instructed position in the x-axis direction and the velocity component of the moving speed of the instructed position in the y-axis direction.

The moving speed set unit (reference moving speed calculation unit) may be configured to determine a reference moving speed of the instructed position such that the reference moving speed becomes larger as the operation quantity of the operation unit becomes larger. In this way, the moving speed set unit may correct the reference moving speed to set the moving speed of the instructed position. According to the present configuration, a user can select a fundamental speed of the instructed position arbitrarily. Therefore, a user is enabled to accelerate or decelerate movement of the pointer and change the direction.

The vehicular input device may further include a selected-state area highlight unit configured to highlight the selective area, which is determined by the selected-state area determination unit as a selected-state area, to emphasize the highlighted selective area compared with another selective area on the display surface of the indication unit. In this way, the selective area selected by the instructed position becomes distinguishable. The instructed position may be rendered non-indicative on the display surface of the indication unit. According to the present configuration, the moving speed of the instructed position is controlled. Consequently, a moving track of the instructed position does not necessarily coincide with the operation direction of the operation unit to cause a user to feel uncomfortable when the instructed position is indicated. In consideration of this, the instructed position may be rendered non-indicative thereby not to cause a user to feel uncomfortable. In this case, at least the selected-state area should be highlighted. Alternatively, the vehicular input device may include a pointing image indication unit in dependence upon user's preference. The pointing image indication unit may be configured to cause the display surface of the indication unit to indicate the pointing image showing the instructed position.

The moving speed set unit may be further configured to set the moving speed of the instructed position at a predetermined selected-area-outside speed in a region of the display surface of the indication unit outside the multiple selective areas. Specifically, the moving speed set unit may set the selected-area-outside speed to be higher than the moving speed of the instructed position in all the selective areas. It is an object of the moving operation of the instructed position to select the selective area. Therefore, instruction of a region outside the selective areas by the instructed position is substantially meaningless. In consideration of this; according to the present configuration, the selected-area-outside speed is set to be higher than the moving speed in all the selective areas. Thereby, a time period required for the instructed position to pass can be reduced. Thus, waiting time can be reduced, and operability can be enhanced.

The vehicular input device may further include a closest selective area determination unit configured to determine a closest selected area, which is closest to the instructed position, from the multiple selective areas. In this way, the moving speed set unit may set the moving speed of the instructed position in a region of the display surface other than the multiple selective areas of the indication unit at a moving speed in the case where the instructed position is in the closest selective area determined by the closest selected area determination unit. In this case, a number of change in the moving speed can be reduced. Thereby, in particular, such an uncomfortable feeling, caused when the instructed position is indicated, can be reduced.

The vehicular input device may further include: a closest selective area determination unit configured to determine a closest selective area, which is closest to the instructed position, from the multiple selective areas; a sameness determination unit configured to determine whether a latest closest selective area, which is newly determined by the closest selective area determination unit, and a previous closest selective area determined immediately before are the same selective area; and an instructed position forcedly move unit configured to forcedly move the instructed position to a center position of the closest selective area, which is newly determined by the closest selective area determination unit, when it is determined not to be the same selective area.

According to the present configuration, a selective area closest to the instructed position is set to be in the selected state. When an instructed position moves to cause another selective area to be in the selected state, the instructed position is skipped to the center of the other selective area. Therefore, a time period required for moving to the center of the other selective area can be omitted.

The vehicular input device may further include a counter force application unit configured to apply a counter force to the operation unit and a counter force control unit configured to variably change a counter force level according to the moving speed of the instructed position, which is set by the moving speed set unit. In the present configuration, a brake can be put on excessive increase in the moving speed.

The vehicular input device may further include: an oscillation application unit configured to apply an oscillation to the operation unit; a switch determination unit configured to determine whether the selective area, which is determined to be the selected-state area by the selected-state area determination unit, is switched to another selective area; and an oscillation control unit configured to cause the oscillation application unit to generate an oscillation on determination that the selected-state area is switched to another selective area.

In this way, an oscillation is caused when the selective area, which is in the selected state according to the instructed position, is switched to another selective area. Thus, a user can recognize the switch easily.

The vehicular input device may further include: a pointing image indication unit configured to cause an indication of the pointing image to show the instructed position on the display surface; and a selected-state area highlight unit configured to indicate a highlighted image on the display surface to emphasize the selective area, which is determined to be the selected-state area, compared with other selective areas.

The vehicular input device may further include: an instructed position switch screen indication unit configured to indicate an instructed position switch screen on the display surface, the instructed position switch screen including an instructed position image indication region and an highlighted image indication region located adjacent to each other and indicated simultaneously, in the instructed position image indication region, the instructed position is represented by the pointing image, and in the highlighted image indication region, the selected-state area, which is determined according to the instructed position, is represented by the highlighted image; an instructed region determination unit configured to determine which the instructed position is located at the instructed position image indication region or the highlighted image indication region, when the instructed position switch screen is indicated; and an instruction image indication switch unit configured such that when the instructed position is determined to be in the instructed position image indication region, the instruction image indication switch unit causes the pointing image indication unit to indicate the pointing image according to the instructed position and prohibits indication of the highlighted image, and when the instructed position is determined to be in the highlighted image indication region, the instruction image indication switch unit causes the selected-state area highlight unit to indicate the highlighted image according to the instructed position.

According to the present configuration, both of the indication of the pointing image (pointer) in the instructed position image indication region and the indication of the highlighted image (cursor) in the highlighted image indication region are determined according to the instructed position. Therefore, indication of the pointing image (pointer) and the highlighted image (cursor) can be smoothly switched. In addition, the processing can be efficiently executed compared with a case where the indication processings are differently executed.

The vehicular input device may further include a moving speed set prohibition unit configured such that when the instructed region determination unit determines the instructed position to be in the instructed position image indication region, the moving speed set prohibition unit prohibits the moving speed set unit from variably setting the moving speed of the instructed position. In this way, unnecessary processings can be omitted, and a load applied to the vehicular input device can be reduced.

The vehicular input device may further include a reference moving speed calculation unit configured to calculate the reference moving speed of the instructed position such that the reference moving speed becomes large as the operation quantity of the operation unit becomes large. In this case, the moving speed set unit may be configured to correct the calculated reference moving speed according to the width in the x-axis direction and the width in the y-axis direction determined by the width determination unit thereby to variably set the moving speed of the instructed position. In addition, the moving speed set prohibition unit may be configured to prohibit correction and cause the moving speed set unit to set the moving speed of the instructed position at the reference moving speed.

The instruction image indication switch unit may be further configured such that when the instructed position is determined to be in the highlighted image indication region, the instruction image indication switch unit may prohibit indication of the pointing image.

The above structures of the embodiments can be combined as appropriate. The above processings such as calculations and determinations are not limited being executed by the control unit 10 and the control unit 20. The control unit may have various structures including the control unit 10 and the control unit 20 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A vehicular input device comprising:
an indication unit configured to cause a display surface to indicate a plurality of arranged selective areas for accepting input, the display surface being assigned with an x-axis direction and a y-axis direction being perpendicular to each other;
an operation unit configured to be manipulated for moving an instructed position on the display surface;
an instructed position move unit configured to move the instructed position on the display surface according to an operation quantity of the operation unit;
a selected-state area determination unit configured to determine a selected-state area being selected from the selective areas according to the instructed position;
a width determination unit configured to determine a width of the selected-state area in the x-axis direction and a width of the selected-state area in the y-axis direction;
a moving speed set unit configured such that when the instructed position move unit moves the instructed position on the display surface and at least when the instructed position passes through the selected-state area, the moving speed set unit sets a moving speed of the instructed position variably, such that:
  i) a velocity component of the moving speed of the instructed position in the x-axis direction becomes larger as the width of the selected-state area in the x-axis direction determined by the width determination unit becomes larger; and
  ii) a velocity component of the moving speed of the instructed position in the y-axis direction becomes larger as the width of the selected-state area in the y-axis direction determined by the width determination unit becomes larger;
a closest selective area determination unit configured to determine a closest selective area, which is closest to the instructed position, from the selective areas;
a sameness determination unit configured to determine whether a latest closest selective area, which is newly determined by the closest selective area determination unit, is same as a previous closest selective area determined by the closest selective area determination unit immediately before; and
a forcedly move unit configured to forcedly move the instructed position into the closest selective area, which is newly determined by the closest selective area determination unit, when the sameness determination unit determines that the latest closest selective area is not same as the previous closest selective area.

2. The vehicular input device according to claim 1, wherein the moving speed set unit is further configured to:
variably set the velocity component of the moving speed of the instructed position in the x-axis direction to be in proportion to the width of the selected-state area in the x-axis direction determined by the width determination unit; and
variably set the velocity component of the moving speed of the instructed position in the y-axis direction to be in proportion to the width of the selected-state area in the y-axis direction determined by the width determination unit.

3. The vehicular input device according to claim 1, wherein the moving speed set unit is further configured such that:
when the moving speed of the instructed position is greater than a predetermined upper limit, the moving speed set unit sets the moving speed at the upper limit, and
when the moving speed of the instructed position is less than a predetermined lower limit, the moving speed set unit sets the moving speed at the lower limit.

4. The vehicular input device according to claim 1, wherein the moving speed set unit is further configured to correct a reference moving speed of the instructed position to determine the moving speed of the instructed position, such that the reference moving speed becomes larger as the operation quantity of the operation unit becomes larger.

5. The vehicular input device according to claim 1, wherein the instructed position is non-indicative on the display surface.

6. The vehicular input device according to claim 1, further comprising:
a pointing image indication unit configured to cause an indication of the pointing image to represent the instructed position on the display surface.

7. The vehicular input device according to claim 1, wherein the moving speed set unit is further configured to set the moving speed of the instructed position, when being in a region of the display surface other than the selective areas, according to a predetermined selected-area-outside coefficient.

8. The vehicular input device according to claim 1, wherein the moving speed set unit is further configured to set the moving speed of the instructed position, when being in a region of the display surface other than the selective areas, at a moving speed in the case where the instructed position is in the closest selective area determined by the closest selected area determination unit.

9. The vehicular input device according to claim 1, wherein the forcedly move unit is further configured to forcedly move the instructed position to a center position of the closest selective area, which is newly determined by the closest selective area determination unit, when the sameness determination unit determines that the latest closest selective area, which is newly determined by the closest selective area determination unit, is not same as the previous closest selective area.

10. The vehicular input device according to claim 1, further comprising:
    a counter force application unit configured to apply a counter force to the operation unit; and
    a counter force control unit configured to variably set a level of the counter force according to the moving speed of the instructed position being set by the moving speed set unit.

11. The vehicular input device according to claim 1, further comprising:
    an oscillation application unit configured to apply an oscillation to the operation unit;
    a switch determination unit configured to determine whether the selective area, which is determined to be the selected-state area by the selected-state area determination unit, is switched to another selective area; and
    an oscillation control unit configured to cause the oscillation application unit to generate an oscillation on determination of the switch determination unit that the selected-state area is switched to another selective area.

12. The vehicular input device according to claim 1, further comprising:
    a pointing image indication unit configured to cause an indication of the pointing image representing the instructed position on the display surface;
    a selected-state area highlight unit configured to indicate a highlighted image on the display surface to emphasize the selective area, which is determined to be the selected-state area, compared with other selective areas;
    a switch screen indication unit configured to indicate an instructed position switch screen on the display surface, the instructed position switch screen including an instructed position image region and an highlighted image region located adjacent to each other and indicated simultaneously, wherein the instructed position is represented by the pointing image when being in the instructed position image region, wherein the selected-state area, which is determined according to the instructed position, is represented by the highlighted image when being in the highlighted image region;
    an instructed region determination unit configured such that, when the instructed position switch screen is indicated, the instructed region determination unit determines one of the instructed position image region and the highlighted image region in which the instructed position is located; and
    an indication switch unit configured such that:
        i) when the instructed region determination unit determines the instructed position to be in the instructed position image region, the indication switch unit:
            causes the pointing image indication unit to indicate the pointing image according to the instructed position; and
            prohibits indication of the highlighted image; and
        ii) when the instructed region determination unit determines the instructed position to be in the highlighted image region, the indication switch unit causes the selected-state area highlight unit to indicate the highlighted image according to the instructed position.

13. The vehicular input device according to claim 12, further comprising:
    a prohibition unit configured such that when the instructed region determination unit determines the instructed position to be in the instructed position image region, the prohibition unit prohibits the moving speed set unit from variably setting the moving speed of the instructed position.

14. The vehicular input device according to claim 13, further comprising:
    a calculation unit configured to calculate a reference moving speed of the instructed position such that the reference moving speed becomes larger as the operation quantity of the operation unit becomes larger, wherein
    the moving speed set unit is further configured to correct the calculated reference moving speed according to the width of the selected-state area in the x-axis direction and the width of the selected-state area in the y-axis direction determined by the width determination unit to variably set the moving speed of the instructed position, and
    the prohibition unit is further configured to prohibit the correction and cause the moving speed set unit to set the moving speed of the instructed position at the reference moving speed.

15. The vehicular input device according to claim 13, wherein the indication switch unit is further configured such that when the instructed region determination unit determines the instructed position to be in the highlighted image region, the indication switch unit prohibits indication of the pointing image.

* * * * *